United States Patent
Patil et al.

(10) Patent No.: US 12,430,756 B2
(45) Date of Patent: Sep. 30, 2025

(54) PREDICTION OF GEOGRAPHIC-ATROPHY PROGRESSION USING SEGMENTATION AND FEATURE EVALUATION

(71) Applicant: Genentech, Inc., South San Francisco, CA (US)

(72) Inventors: Jasmine Patil, South San Francisco, CA (US); Neha Sutheekshna Anegondi, South San Francisco, CA (US); Alexandre J Fernandez Coimbra, South San Francisco, CA (US); Simon Shang Gao, South San Francisco, CA (US); Michael Gregg Kawczynski, South San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 438 days.

(21) Appl. No.: 17/914,737

(22) PCT Filed: Mar. 23, 2021

(86) PCT No.: PCT/US2021/023784
§ 371 (c)(1),
(2) Date: Sep. 26, 2022

(87) PCT Pub. No.: WO2021/195153
PCT Pub. Date: Sep. 30, 2021

(65) Prior Publication Data
US 2023/0135258 A1     May 4, 2023

Related U.S. Application Data

(60) Provisional application No. 62/993,479, filed on Mar. 23, 2020.

(51) Int. Cl.
   *G06T 7/00*     (2017.01)
   *G06T 7/11*     (2017.01)
   (Continued)

(52) U.S. Cl.
CPC .............. *G06T 7/0012* (2013.01); *G06T 7/11* (2017.01); *G06T 7/60* (2013.01); *G06V 10/82* (2022.01);
(Continued)

(58) Field of Classification Search
None
See application file for complete search history.

(56) References Cited

U.S. PATENT DOCUMENTS

2014/0193062 A1    7/2014   Zhukov et al.
2015/0065803 A1    3/2015   Douglas et al.
(Continued)

FOREIGN PATENT DOCUMENTS

DE    102012007113 A1    10/2013
JP    2019-531817 A    11/2019
WO    2018/069768 A2    4/2018

OTHER PUBLICATIONS

Pfau et al., "Prognostic Value of Shape-Descriptive Factors for the Progression of Geographic Atrophy Secondary to Age-Related Macular Degeneration," Retina, 2019, vol. 39, No. 8, pp. 1527-1539.
(Continued)

*Primary Examiner* — Thomas D Lee
(74) *Attorney, Agent, or Firm* — Haynes and Boone, LLP

(57) ABSTRACT

A method, system, and computer program product for evaluating a geographic atrophy lesion. An image of a geographic atrophy (GA) lesion is received. A first set of values is determined for a set of shape features using the image. A second set of values is determined for a set of textural
(Continued)

features using the image. GA progression for the GA lesion is predicted using the first set of values and the second set of values.

11 Claims, 24 Drawing Sheets

(51) Int. Cl.
  *G06T 7/60* (2017.01)
  *G06V 10/82* (2022.01)
(52) U.S. Cl.
  CPC ............... *G06T 2207/10064* (2013.01); *G06T 2207/10101* (2013.01); *G06T 2207/30096* (2013.01)

(56) References Cited

U.S. PATENT DOCUMENTS

| | | | |
|---|---|---|---|
| 2016/0284103 A1* | 9/2016 | Huang | A61B 8/085 |
| 2017/0103525 A1 | 4/2017 | Hu et al. | |
| 2018/0318302 A1* | 11/2018 | Kerr | A61K 47/34 |

OTHER PUBLICATIONS

Ronneberger et al., "U-Net: Convolutional Networks for Biomedical Image Segmentation," https://arxiv.org/abs/1505.04597, May 18, 2015, 8 pages.
Hu et al., "Automated Segmentation of Geographic Atrophy Using Deep Convolutional Neural Networks," Proceedings vol. 10575, SPIE Medical Imaging, Feb. 10-15, 2018.
Hu et al., "Automated Segmentation of Geographic Atrophy in Fundus Autofluorescence Images Using Supervised Pixel Classification," SPIE Medical Imaging 2018, vol. 10575, pp. 1057511-1 to 1057511-9.
Feeny et al., "Automated Segmentation of Geographic Atrophy of the Retinal Epithelium via Random Forests in AREDS Color Fundus Images," Computers in Biology and Medicine, Oct. 1, 2015, 25 pages.
Pekala et al., "Deep Learning Based Retinal OCT Segmentation," Jan. 29, 2018, https://arxiv.org/abs/1801.09749v1, 11 pages.
Iglovikov et al., "TernausNet: U-Net with VGG11 Encoder Pre-Trained on ImageNet for Image Segmentation," Jan. 17, 2018, https://arxiv.org/abs/1801.05746, 5 pages.
International Search Report and Written Opinion mailed Jun. 30, 2021 from International Application No. PCT/US2021/023784, 9 pages.
International Preliminary Report on Patentability dated Sep. 22, 2022 from International Application No. PCT/US2021/023784, 7 pages.
Niu et al., "Fully Automated Prediction of Geographic Atrophy Growth Using Quantitative Spectral-Domain Optical Coherence Tomography Biomarkers," Ophtalmology, Elsevier, Amsterdam, NL, vol. 123, No. 8, Jun. 1, 2016, pp. 1737-1750.
Xu et al., "Multi-path 3D Convolution Neural Network for Automated Geographic Atrophy Segmentation in SD-OCT Images," International Conference on Image Analysis and Processing, 17th International Conference, Naples, Italy, Sep. 9-13, 2013, pp. 493-495.
Office Action issued Dec. 17, 2024 from related Japanese Application No. 2022-557088, five pages.
Communication pursuant to Article 94(3) EPC dated Apr. 24, 2025 in related European application No. 21718756.6, 6 pages.
Anegondi et al., "Evaluation of shape-descriptive and texture features as potential prognostic variables in progression of geographic atrophy." Investigative Ophthalmology & Visual Science, Jul. 2019, vol. 60, 1906, 3 pages.
Wu et al., "Geographic atrophy segmentation in SD-OCT images using synthesized fundus autofluorescence imaging", Computer Methods and Programs in Biomedicine, vol. 182, Dec. 1, 2019, 105101, 10 pages.
Office Action mailed Jul. 1, 2025 in related Japanese Application No. 2022-557088, 4 pages.

* cited by examiner

| Parameters | Baseline | 18-month | $R^2$ |
|---|---|---|---|
| | Shape-descriptive | | |
| Perimeter(mm) | 24.45 (2.07) | 29.39 (2.24) | 0.20 |
| Circularity | 0.2(0.02) | 0.17(0.02) | 0.18 |
| Feret$_{max}$(mm) | 3.51 (0.13) | 3.94 (0.13) | 0.15 |
| Feret$_{min}$(mm) | 2.81 (0.11) | 3.25 (0.12) | 0.24 |
| Sqrt. lesion area | 2.43 (0.07) | 2.82 (0.08) | 0.28 |
| Sqrt. perimeter | 4.8 (0.21) | 5.29 (0.21) | 0.17 |
| Sqrt. circularity | 0.42 (0.02) | 0.39 (0.02) | 0.23 |
| | Textural | | |
| Contrast | 0.29(0.02) | 0.27(0.01) | 0.02 |
| Correlation | 0.91(0.01) | 0.92(0.01) | 0.003 |
| Energy | 0.14 (0.005) | 0.13 (0.005) | 0.10 |
| Homogeneity | 0.86(0.007) | 0.87 (0.006) | 0.02 |

FIG. 7

PREDICTION OF GEOGRAPHIC-ATROPHY PROGRESSION USING SEGMENTATION AND FEATURE EVALUATION

CROSS-REFERENCE TO RELATED APPLICATIONS

The present application is a U.S. National Stage patent application of International Patent Application No. PCT/US2021/023784, filed on Mar. 23, 2021, which claims the benefit of U.S. Provisional Application No. 62/993,479 filed Mar. 23, 2020, each of which is incorporated herein by reference in its entirety.

FIELD

This description is generally directed towards geographic atrophy (GA) evaluation. More specifically, this description provides methods and systems for the automated segmentation and determination of features that enable prediction of GA progression and for the prediction of GA progression using such features.

BACKGROUND

Age-related macular degeneration (AMD) is a leading cause of vision loss in patients 50 years or older. Geographic atrophy (GA) is one of two advanced stages of AMD and is characterized by progressive and irreversible loss of choriocapillaries, retinal pigment epithelium (RPE), and photoreceptors. GA can lead to a loss of visual function over time. The diagnosis and monitoring of GA lesion enlargement may be performed using fundus autofluorescence (FAF) images that are obtained by confocal scanning laser ophthalmoscopy (cSLO). This type of imaging technology, which shows topographic mapping of lipofuscin in RPE, can be used to measure change in GA lesions over time. On FAF images, GA lesions appear as regions of hypoautofluorescence with sharply demarcated boundaries, due to loss of RPE and thus lipofuscin. Some currently available methods for evaluating GA include grading GA lesions based on FAF images. However, quantifying GA lesions using FAF images is typically a manual process that is more time-consuming and more prone to inter-observer and intra-observer variability than desired. Thus, it may be desirable to have one or more methods, systems, or both that recognize and take into account one or more of these issues.

SUMMARY

In one or more embodiments, a method is provided for evaluating a geographic atrophy lesion. An image of the geographic atrophy (GA) lesion is received. A first set of values for a set of shape features is determined using the image. A second set of values for a set of textural features is determined using the image. GA progression for the GA lesion is determined using the first set of values and the second set of values.

In one or more embodiments, a method is provided for evaluating a geographic atrophy (GA) lesion. An image of the geographic atrophy (GA) lesion of a subject is received. The image is input into a deep learning system. A first segmentation output is generated using the deep learning system. The first segmentation output identifies pixels in the image corresponding to the GA lesion.

In one or more embodiments, a system comprises one or more data processors and a non-transitory computer readable storage medium containing instructions which, when executed on the one or more data processors, cause the one or more data processors to perform part or all of one or more methods such as, for example, a first method, a second method, or both. The first method includes receiving an image of a geographic atrophy (GA) lesion; determining a first set of values for a set of shape features using the image; determining a second set of values for a set of textural features using the image; and predicting GA progression for the GA lesion using the first set of values and the second set of values. The second method includes receiving an image of a geographic atrophy (GA) lesion of a subject; inputting the image into a deep learning system; and generating a first segmentation output using the deep learning system, the first segmentation output identifying pixels in the image corresponding to the GA lesion.

In one or more embodiments, a computer program product tangibly embodied in a non-transitory machine-readable storage medium includes instructions configured to cause one or more data processors to perform part or all of one or more methods such as, for example, a first method, a second method, or both. The first method includes receiving an image of a geographic atrophy (GA) lesion; determining a first set of values for a set of shape features using the image; determining a second set of values for a set of textural features using the image; and predicting GA progression for the GA lesion using the first set of values and the second set of values. The second method includes receiving an image of a geographic atrophy (GA) lesion of a subject; inputting the image into a deep learning system; and generating a first segmentation output using the deep learning system, the first segmentation output identifying pixels in the image corresponding to the GA lesion

BRIEF DESCRIPTION OF THE DRAWINGS

For a more complete understanding of the principles disclosed herein, and the advantages thereof, reference is now made to the following descriptions taken in conjunction with the accompanying drawings, in which:

FIG. 7 is a table identifying illustrating various metrics for shape and textural features in accordance with various embodiments.

Figure 1:
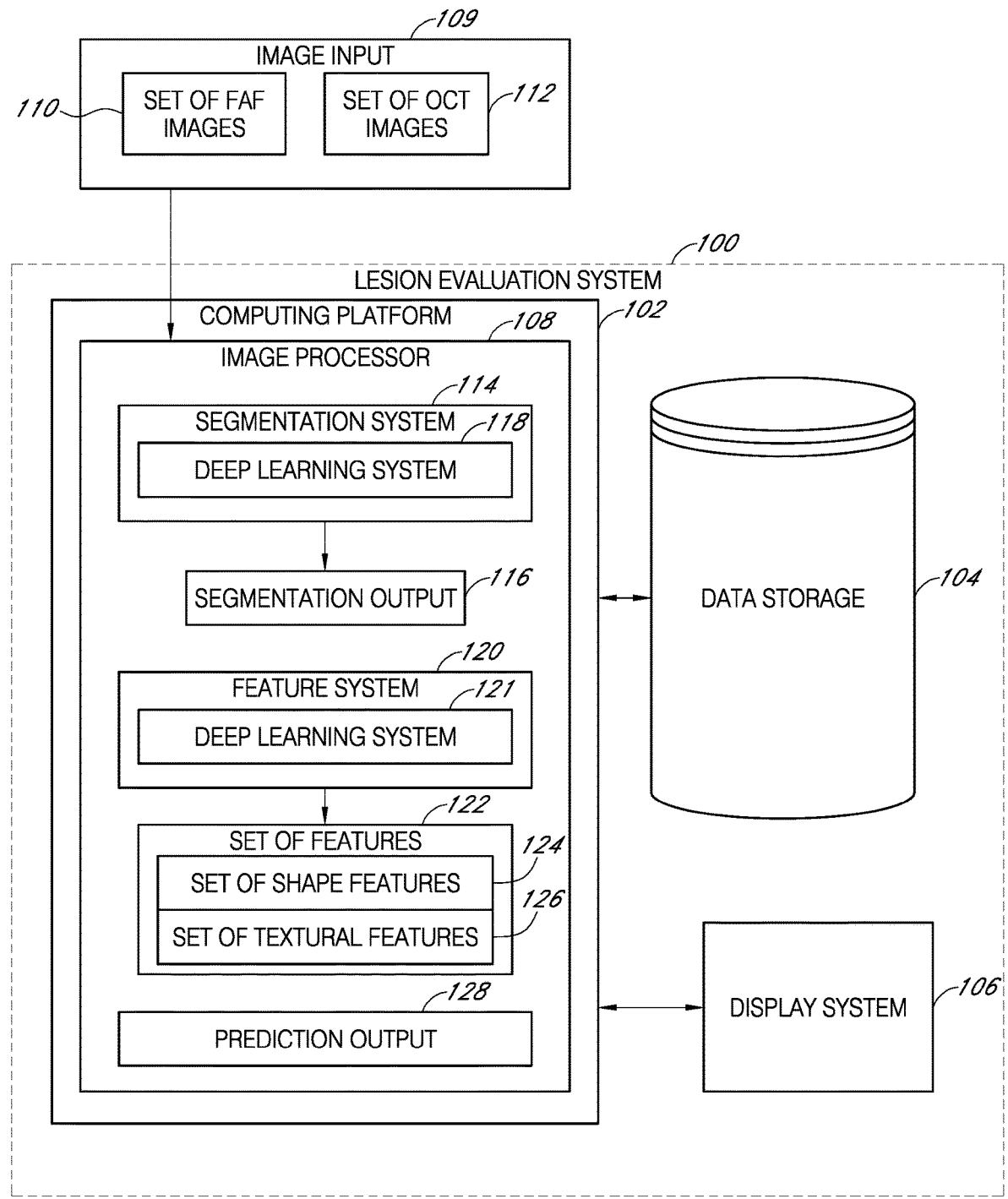
FIG. 1 is a block diagram of a lesion evaluation system 100 in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

I. Overview

Current methods for evaluating geographic atrophy (GA) include analyzing various images, such as fundus autofluorescence (FAF) images and optical coherence tomography (OCT) images, to evaluate GA lesions. Such images may be segmented, used to identify features that provide information about GA lesions, and used to quantitatively assess GA lesions.

Some methods of segmentation include using software, which may be, for example, semi-automated, to segment GA lesions in FAF images or OCT images and, more specifically, OCT en face (or en-face or enface) images. OCT en face images are transverse images of retinal and choroidal layers at specified depths. Segmentation includes creating a pixel-wise mask for the GA lesion in the images. The pixel-wise mask may identify or categorize each pixel as belonging to one of at least two different classes. As one example, each pixel may be assigned to either a first class corresponding to a GA lesion or a second class that does not correspond to the GA lesion. In this manner, pixels assigned to the first class identify the GA lesion. This type of segmentation may be referred to as GA segmentation.

Proper segmentation enables identifying and tracking the growth rate of a GA lesion, can help distinguish between unifocal and multifocal lesions, and can enable quantifying features (e.g., area, perimeter, diameter, etc.) corresponding to the GA lesion. A unifocal GA lesion may be a lesion that arises from a single focus or location. A multifocal GA lesion may be a GA lesion that includes lesions arising from multiple foci or locations.

However, some currently available methods for segmentation involve manual or semi-automated segmentation. These types of segmentation methods may be less accurate than desired in capturing the portion of an image that corresponds to a GA lesion. Further, these types of segmentation methods may be time-consuming or tedious. For example, manual segmentation of an image may take about 12 minutes per image, while semi-automated segmentation may take about 1 minute per image. Thus, the embodiments described herein provide methods and systems for fully automating segmentation of images of GA lesions. The embodiments described enable automated segmentation of GA lesions based on images using a deep learning system. Automated segmentation of an image may take only a few seconds. The deep learning system may be trained on training data for a plurality of subjects having different types of lesions to improve the performance of the deep learning system. The deep learning system may include, for example, one or more neural network models.

Further, the embodiments described herein recognize that some currently available methods for evaluating GA lesions may not be suited for evaluating GA lesion enlargement over time. For example, the correlation of actual GA lesion enlargement from a baseline point in time to a later point in time (e.g., 6 months, 12 months, etc.) with the GA lesion enlargement estimated via some of the currently available methods may not be as high as desired. Monitoring GA lesion enlargement over time may be crucial to, for example, clinical studies. For example, improved predictors for GA progression may be used in clinical trials to provide stratification factors, inclusion/exclusion criteria, covariates for analysis, and/or other types of information for improving or enhancing design of the clinical trials.

Thus, the methods and systems described herein enable identifying values for various features (e.g., shape features and textural features) corresponding to GA lesions that have prognostic capabilities with respect to predicting GA progression. In one or more embodiments, the process of predicting GA progression based on these features is fully automated. Further, the embodiments described herein provide methods and systems for identifying which features have prognostic capabilities (e.g., as compared to other features). Regression modeling may be used to select these prognostic features.

Recognizing and taking into account the importance and utility of a methodology and system that can provide the improvements described above, the specification describes various embodiments for segmenting GA lesions using images of GA lesions to generate segmentation masks. Further, the specification describes various embodiments for evaluating features for the GA lesions based on images or segmentation masks of the GA lesions. Still further, the specification describes various embodiments for determining features that have prognostic capabilities with respect to GA progression. The embodiments described herein enable improved performance in quantitatively assessing GA lesions including, for example, predicting GA progression (e.g., change in GA lesion area over time).

II. Definitions

The disclosure is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion.

In addition, as the terms "on," "attached to," "connected to." "coupled to," or similar words are used herein, one element (e.g., a component, a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. In addition, where reference is made to a list of elements (e.g., elements a, b, c), such reference is intended to include any one of the listed elements by itself, any combination of less than all of the listed elements, and/or a combination of all of the listed elements. Section divisions in the specification are for case of review only and do not limit any combination of elements discussed.

The term "subject" may refer to a subject of a clinical trial, a person undergoing treatment, a person undergoing anti-cancer therapies, a person being monitored for remission or recovery, a person undergoing a preventative health analysis (e.g., due to their medical history), or any other person or patient of interest. In various cases, "subject" and "patient" may be used interchangeably herein.

Unless otherwise defined, scientific and technical terms used in connection with the present teachings described herein shall have the meanings that are commonly understood by those of ordinary skill in the art. Further, unless otherwise required by context, singular terms shall include pluralities and plural terms shall include the singular. Generally, nomenclatures utilized in connection with, and techniques of, chemistry, biochemistry, molecular biology, pharmacology and toxicology are described herein are those well-known and commonly used in the art.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The term "ones" means more than one.

As used herein, the term "plurality" can be 2, 3, 4, 5, 6, 7, 8, 9, 10, or more.

As used herein, the term "set of" means one or more. For example, a set of items includes one or more items.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" means item A; item A and item B; item B; item A, item B, and item C; item B and item C; or item A and C. In some cases, "at least one of item A, item B, or item C" means, but is not limited to, two of item A, one of item B, and ten of item C; four of item B and seven of item C; or some other suitable combination.

As used herein, a "model" may include one or more algorithms, one or more mathematical techniques, one or more machine learning algorithms, or a combination thereof.

As used herein, "machine learning" may include the practice of using algorithms to parse data, learn from it, and then make a determination or prediction about something in the world. Machine learning uses algorithms that can learn from data without relying on rules-based programming.

As used herein, an "artificial neural network" or "neural network" (NN) may refer to mathematical algorithms or computational models. Neural networks, which may also be referred to as neural nets, can employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. In the various embodiments, a reference to a "neural network" may be a reference to one or more neural networks.

A neural network may process information in two ways; when it is being trained it is in training mode and when it puts what it has learned into practice it is in inference (or prediction) mode. Neural networks may learn through a feedback process (e.g., backpropagation) which allows the network to adjust the weight factors (modifying its behavior) of the individual nodes in the intermediate hidden layers so that the output matches the outputs of the training data. In other words, a neural network may receive training data (learning examples) and learn how to reach the correct output, even when it is presented with a new range or set of inputs. A neural network may include, for example, without limitation, at least one of a Feedforward Neural Network (FNN), a Recurrent Neural Network (RNN), a Modular Neural Network (MNN), a Convolutional Neural Network (CNN), a Residual Neural Network (ResNet), an Ordinary Differential Equations Neural Networks (neural-ODE), or another type of neural network.

As used herein, a "lesion" may include a region in an organ or tissue that has suffered damage via injury or disease. This region may be a continuous or discontinuous region. For example, as used herein, a lesion may include multiple regions. A geographic atrophy (GA) lesion is a region of the retina that has suffered chronic progressive degeneration. As used herein, a GA lesion may include one lesion (e.g., one continuous lesion region) or multiple lesions (e.g., discontinuous lesion region comprised of multiple, separate lesions).

As used herein, a "lesion area" may refer to the total area covered by a lesion, whether that lesion be a continuous region or a discontinuous region.

As used herein, "longitudinal" entails over a period of time. The period of time may be in days, weeks, months, years, or some other measure of time.

As used herein, a "mask" includes a type of image in which each pixel of the image has one of at least two different preselected potential values.

III. Geographic Atrophy (GA) Lesion Evaluation

FIG. 1 is a block diagram of a lesion evaluation system 100 in accordance with various embodiments. Lesion evaluation system 100 is used to evaluate geographic atrophy (GA) lesions in the retinas of subjects. Lesion evaluation system 100 includes computing platform 102, data storage 104, and display system 106. Computing platform 102 may take various forms. In one or more embodiments, computing platform 102 includes a single computer (or computer system) or multiple computers in communication with each other. In other examples, computing platform 102 takes the form of a cloud computing platform.

Data storage 104 and display system 106 are each in communication with computing platform 102. In some examples, data storage 104, display system 106, or both may be considered part of or otherwise integrated with computing platform 102. Thus, in some examples, computing platform 102, data storage 104, and display system 106 may be separate components in communication with each other, but in other examples, some combination of these components may be integrated together.

Lesion evaluation system 100 includes image processor 108, which may be implemented using hardware, software, firmware, or a combination thereof. In one or more embodiments, image processor 108 is implemented in computing platform 102.

Image processor 108 receives image input 109 for processing. In one or more embodiments, image input 109 includes set of fundus autofluorescence (FAF) images 110, set of optical coherence tomography (OCT) images 112, one or more other types of images (e.g., infrared (IR) images, or a combination thereof. In one or more embodiments, image input 109 includes images generated by a same imaging device.

In various embodiments, image processor 108 processes image input 109 using segmentation system 114 to generate segmentation output 116 corresponding to a GA lesion. In one or more embodiments, segmentation system 114 includes deep learning system 118. Deep learning system 118 may include any number of or combination of neural network systems, each of which includes one or more neural network models. In one or more embodiments, deep learning system 118 includes a convolutional neural network (CNN) model that includes one or more neural networks. Each of these one or more neural networks may itself be a convolutional neural network. In some embodiments, deep learning system 118 includes a U-Net (U-shaped neural network model).

Segmentation output 116 generated by deep learning system 118 includes one or more segmentation masks. Each segmentation mask provides a pixel-wise evaluation of a region of a retina. For example, a segmentation mask in segmentation output 116 may be a binary image in which each pixel has one of two values. As one specific example, the segmentation mask may be a binary image in black and white in which the white indicates an area identified as the GA lesion.

In one or more embodiments, deep learning system 118 is used to generate a preliminary probability map image in which each pixel has an intensity ranging from 0 to 1. Pixel intensities closer to 1 are more likely to be the GA lesion. Deep learning system 118 may include a thresholding module that applies a threshold to the preliminary probability map to produce a segmentation mask in the form of a binary probability map. For example, any pixel intensity in the preliminary probability map at or above the threshold (e.g., 0.5, 0.75, etc.) may be assigned an intensity of "1," while any pixel intensity in the preliminary probability map below the threshold may be assigned an intensity of "0." In this manner, segmentation output 116 includes a binary segmentation mask that identifies areas identified as the GA lesion.

In various embodiments, segmentation output 116 includes as many segmentation masks as desired to evaluate the GA lesion over a selected period of time (e.g., 3 months, 6 months, 12 months, 18 months, etc.). Further, segmentation output 116 may include as many segmentation masks as desired to evaluate the GA lesion at the desired time intervals within the selected period of time. The desired time intervals may be constant or different time intervals. In one or more embodiments, segmentation output 116 includes a segmentation mask for every 10 days within a 12-month period.

In various embodiments, image processor 108 (or another agent or module implemented within computing platform 102) uses segmentation output 116 to generate a quantitative assessment of the GA lesion. For example, image processor 108 may include feature system 120 that is capable of receiving a segmentation output, such as segmentation output 116 as input. Feature system 120 uses segmentation output 116 to extract plurality of features 122 corresponding to the GA lesion. In one or more embodiments, feature system 120 includes deep learning system 121, which may be implemented using, for example, or more neural network models.

Plurality of features 122 may include, for example, without limitation, set of shape features 124 and set of textural features 126. Set of shape features 124 may include, for example, at least one of a lesion area, a convex area, a perimeter, circularity, a maximum Feret diameter, a minimum Feret diameter, a square root of a GA lesion area, a square root of the perimeter, a square root of the circularity, or some other type of shape feature.

In some embodiments, set of shape features 124 for a particular GA lesion, which may be unifocal or multifocal, includes various metrics associated with at least one of the area, convex area, perimeter, centroid, eccentricity, major axis length, or minor axis length for each lesion of the GA lesion. For example, when the GA lesion is a multifocal lesion, set of shape features 124 may include at least one of the area, convex area, perimeter, centroid, eccentricity, major axis length, or minor axis length for each lesion of the GA lesion. In some cases, each feature includes the corresponding values for the different lesions of the GA lesion, sorted by size. In one or more embodiments, set of shape features 124 includes the averages, weighted averages, standard deviations, or a combination thereof of at least one of the areas, convex areas, perimeters, centroids, eccentricities, major axis lengths, or minor axis lengths for all lesions of the GA lesion. In some embodiments, set of shape features 124 includes at least one of the area, convex area, perimeter, centroid, eccentricity, major axis length, or minor axis length for the largest lesion of the GA lesion. In some embodiments, set of shape features 124 includes at least one of the area, perimeter, centroid, eccentricity, major axis length, or minor axis length for the convex hull that encompasses all of the lesions of the GA lesion.

Set of textural features 126 may include, for example, one or more metrics quantifying at least one of contrast, energy, entropy, homogeneity, or some other type of textural feature. In some embodiments, one or more of the textural features in set of textural features 126 are derived using the gray level co-occurrence matrix (GLCM), which can be created using image input 109, segmentation output 116, or both. The GLCM uses the adjacency concept and gives a spatial relationship between pixels of an image. In various embodiments, set of textural features 126 includes, for example, without limitation, different metrics relating to the pixel intensities and other textural characteristics corresponding to the GA lesion.

These different types of features may be used to quantitatively assess the GA lesion at any given point in time or longitudinally. For example, for a segmentation mask in segmentation output 116, the number of lesions may be the number of discontinuous regions or areas identified in the segmentation mask that form the GA lesion. Examples of features in plurality of features 122 include lesion area (or total lesion area) and lesion perimeter (or total lesion perimeter). The lesion area or total lesion area may be identified as the total area or space occupied by the one or more lesions identified. The lesion perimeter or total lesion perimeter may be, for example, the perimeter of a general area or space occupied by the one or more lesions. In other examples, the total lesion perimeter may be the sum of the individual perimeters for the one or more lesions. In some cases, plurality of features 122 includes one or more features that are computed based on one or more other features in plurality of features 122

Plurality of features 122 may be used to evaluate the GA lesion longitudinally. For example, in some cases, plurality of features 122 may be used to generate prediction output 128. Prediction output 128 includes, for example, a prediction of GA progression. For example, image input 109 may include images for the same or substantially same (e.g., within the same hour, within the same day, within the same 1-3 days, etc.) points in time. Plurality of features 122, or at least a portion of plurality of features 122 may enable a longitudinal quantitative assessment of the GA lesion over time. Prediction output 128 may include, for example, a prediction of a change in GA lesion area over a selected period of time (e.g., between a baseline point in time and 6 months, between the baseline point in time and 12 months, between the baseline point in time and 18 months out, etc.).

In some embodiments, plurality of features 122 or a portion of plurality of features 122 may be used to compare or analyze the results of automated segmentation with manual or semi-automated segmentation. This comparison or analysis may be used to, for example, retrain or otherwise adjust the deep learning system 118 used to perform the automated segmentation.

Figure 2:
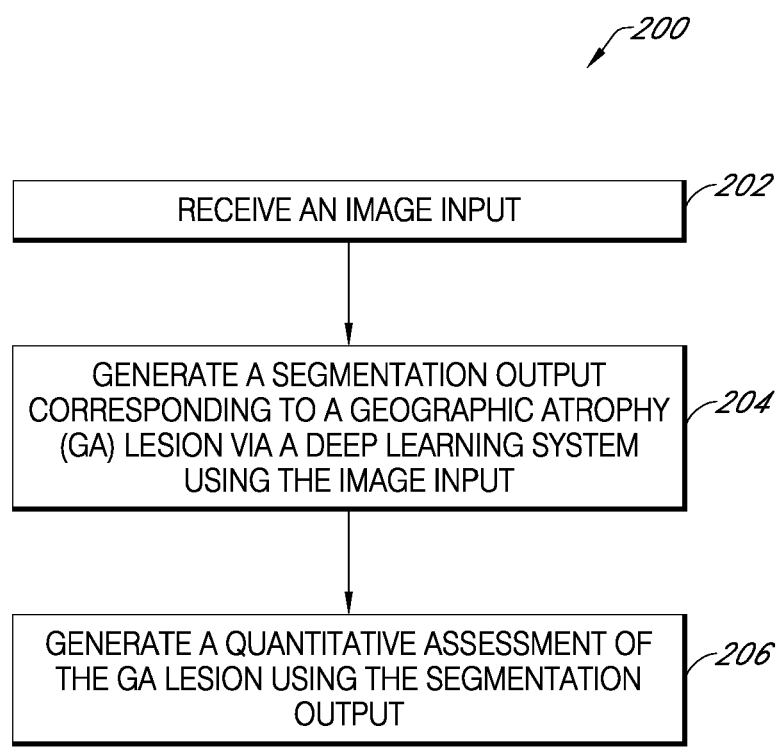
FIG. 2 is a flowchart of a process 200 for evaluating a geographic atrophy lesion in accordance with various embodiments.

FIG. 2 is a flowchart of a process 200 for evaluating a geographic atrophy lesion in accordance with various embodiments. In various embodiments, process 200 is implemented using the lesion evaluation system 100 described in FIG. 1.

Step 202 includes receiving an image input. The image input may include, for example, a set of fundus autofluorescence (FAF) images, a set of optical coherence tomography (OCT) images, a set of infrared (IR) images, one or more other types of images, or a combination thereof. The image input comprises one or more images of a same retina of a subject. In various embodiments, the image input includes images for the same or substantially same (e.g., within the same hour, within the same day, within the same 1-3 days, etc.) points in time. In other embodiments, the image input includes images for a period of time. For example, the image input may include a first image for a baseline point in time and a second image for a future point in time (e.g., 3 months out, 6 months out, 12 months out, 18 months out, etc.)

Step 204 includes generating a segmentation output using the deep learning system, the segmentation output identifying pixels in the image corresponding to the GA lesion. The deep learning system may be, for example, deep learning system 118 in FIG. 1. The deep learning system may include, for example, a convolutional neural network (CNN) system that includes any number of neural networks. The segmentation output may be, for example, segmentation output 116 described in FIG. 1. In one or more example embodiments, the segmentation output includes a segmentation mask that is a binary image in which each pixel has one of two values. For example, the segmentation output may include a binary image in black and white in which the white indicates an area identified as the GA lesion. In some cases, this binary image is referred to as a "segmentation mask" (or simply mask).

Step 206 includes generating a quantitative assessment of the GA lesion using the segmentation output. For example, step 206 may include extracting a plurality of features corresponding to the GA lesion, such as set of features 122 described above with respect to FIG. 1, may be extracted using the segmentation output. The set of features may be used to generate the quantitative assessment of the GA lesion. This quantitative assessment may be a longitudinal assessment. In some embodiments, this quantitative assessment is a prediction of GA progression. For example, the quantitative assessment may include a prediction of a change in GA lesion area over a selected period of time.

IIII.A. GA Lesion Segmentation

Figure 3:
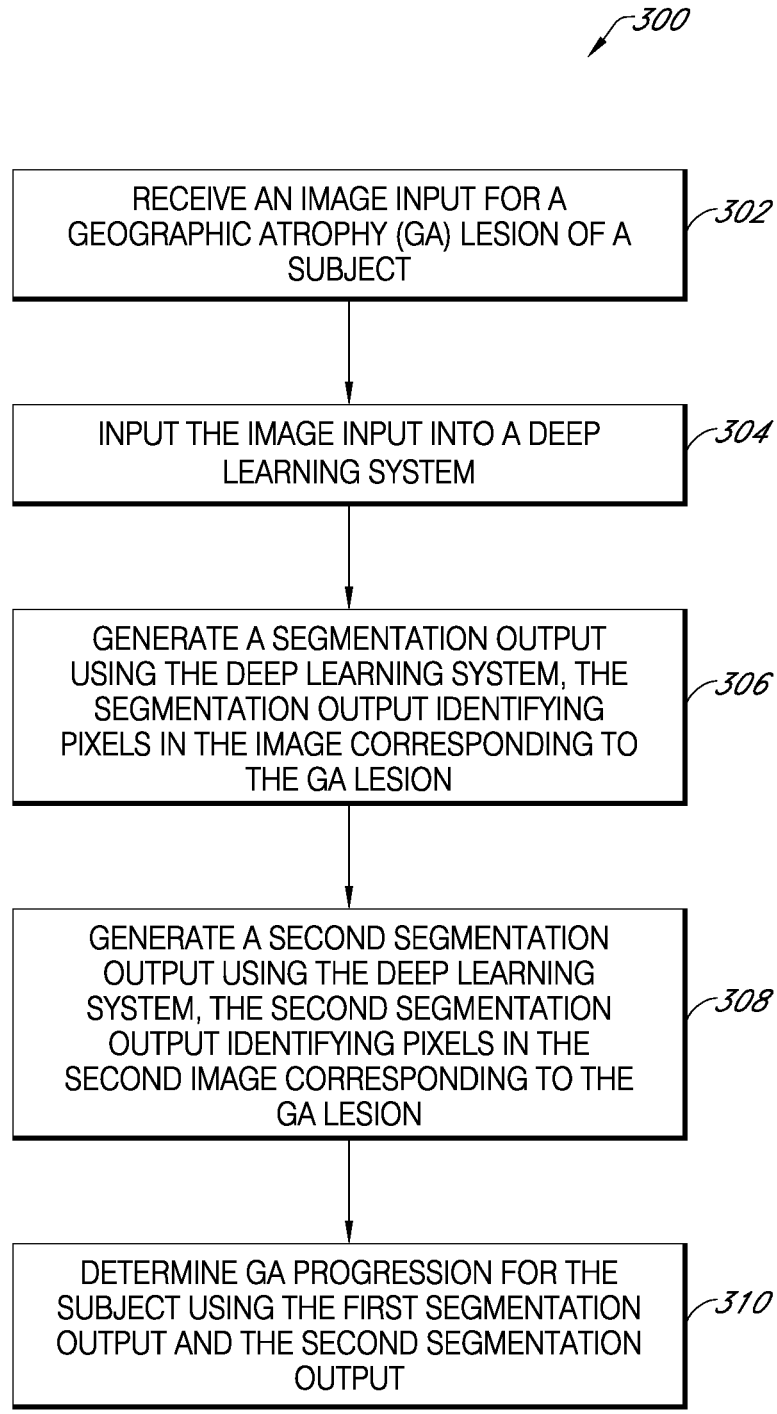
FIG. 3 is a flowchart of a process 300 for generating segmentation outputs for a geographic atrophy lesion in accordance with various embodiments.

FIG. 3 is a flowchart of a process 300 for generating segmentation outputs for a geographic atrophy lesion in accordance with various embodiments. In various embodiments, process 300 is implemented using the lesion evaluation system 100 described in FIG. 1. In these embodiments, process 300 is a fully automated process.

Step 302 includes receiving an image input for a geographic atrophy (GA) lesion of a subject. The image input includes a first image and a second image. The second image may be, for example, a baseline image for a baseline point in time. The first image may be, for example, an image for a later point in time. For example, the first image may be for a point in time post-treatment (e.g., 3 months out, 6 months out, 12 months out, 18 months out, etc.). The image input may include FAF images, OCT images, IR images, or some other type of image.

Step 304 includes inputting the image input into a deep learning system. The deep learning system may include, for example, a neural network system. The neural network system may include one or more neural network models. In one or more embodiments, the neural network system includes a CNN. In other embodiments, the neural network includes a U-Net. In various embodiments, the deep learning system is one that has been trained on various images of Step 306 includes generating a first segmentation output using the deep learning system, the first segmentation output identifying pixels in the first image corresponding to the GA lesion. As described previously, the segmentation output may include one or more segmentation masks. A segmentation mask may be used to in various ways. For example, a segmentation mask for a baseline image may be compared to a segmentation mask for a later point in time to perform a qualitative and/or quantitative assessment of the Step 308 includes generating a second segmentation output using the deep learning system, the second segmentation output identifying pixels in the second image corresponding to the GA lesion.

Step 310 includes determining GA progression for the subject using the first segmentation output and the second segmentation output. In one or more embodiments, step 310 includes a first GA lesion area using the first segmentation output and a second GA lesion area using the second segmentation output. The difference between these two GA lesion areas is the change in GA lesion area between the corresponding two points in time.

GA progression may be determined via one or more metrics. These metrics may include, for example, a change in lesion area, a change in maximum diameter, a change in aspect ratio, a change in cumulative intensity, some other change corresponding to the lesion area with respect to two points in time, or a combination thereof. These metrics may be in percentages, absolute values, or some other type of representation.

III.B. GA Lesion Feature Evaluation

Figure 4:
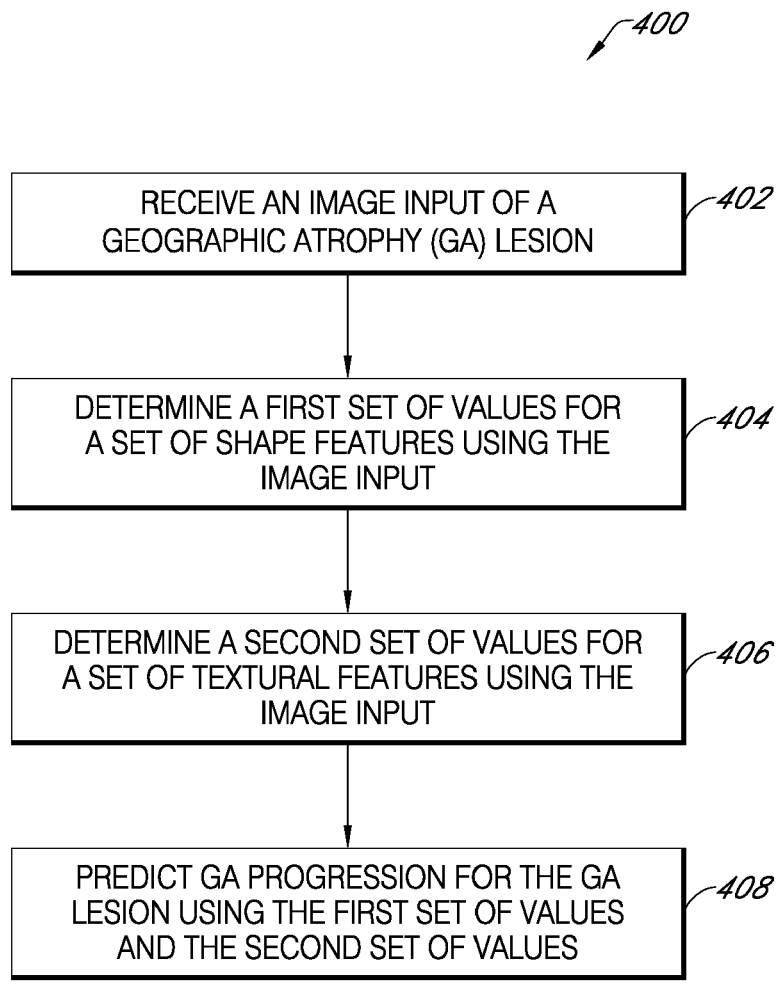
FIG. 4 is a flowchart of a process 400 for evaluating a GA lesion using features in accordance with various embodiments.

FIG. 4 is a flowchart of a process 400 for evaluating a GA lesion using features in accordance with various embodiments. In various embodiments, process 400 is implemented using the lesion evaluation system 100 described in FIG. 1. In various embodiments, process 400 is a semi-automated process. In other embodiments, process 400 is a fully automated process.

Step 402 includes receiving an image input for a geographic atrophy (GA) lesion. In one or more embodiments, the image input includes a segmentation mask. This segmentation mask may be, for example, a segmentation mask generated via process 300 in FIG. 3 (e.g., step 306 or step 308). In other embodiments, the image includes an FAF image, an OCT image, an IR image, or some other type of image. In still other embodiments, the image input includes some combination of the segmentation mask, the FAF image, or the OCT image. The OCT image may be, for example, en face choroidal OCT images.

Step 404 includes determining a first set of values for a set of shape features using the image input. The set of shape features may include various features such as, but not limited to, at least one of a lesion area, a convex area, a perimeter, circularity, a maximum Feret diameter, a minimum Feret diameter, a square root of a GA lesion area, a square root of the perimeter, a square root of the circularity, or some other type of shape feature. When the GA lesion is a multifocal lesion, the values of the features for the various lesions may be processed to compute a weighted average that is used for the value of the feature. In other examples, the feature value corresponding to the largest lesion is used. In still other examples, the feature value is determined by extracting the feature from an overall shape (e.g., convex hull) that encompasses all of the various lesions within the multifocal lesion.

The lesion area is the area of the GA lesion and may be in, for example, $mm^2$. The convex area may be the area of the convex shape or convex hull for the GA lesion and may be in, for example, $mm^2$. The perimeter is the perimeter of the GA lesion and may be in, for example, mm. The maximum Feret diameter may refer to the maximum distance between two parallel tangents to the GA lesion. The minimum Feret diameter may include the minimum distance between two parallel tangents to the GA lesion. Circularity may entail a measure of how circular the GA lesion is. In some cases, circularity is measured as follows:

$$\text{Circularity} = (4 * pi * \text{lesion area})/(\text{perimeter}^2) \quad (1)$$

Step 406 includes determining a second set of values for a set of textural features using the image input. The set of textural features may include various features such as, but not limited to, at least one of contrast, correlation, energy, homogeneity, or some other textural feature. In some embodiments, textural features may be assessed using a gray level co-occurrence matrix (GLCM), which may be created using the image input. The GLCM uses the adjacency concept and gives a spatial relationship between pixels of an image. The GLCM can be used to derive the following textural features as follows:

$$\text{Contrast} = \sum_{i,j=0}^{levels-1} P_{i,j}(i-j)^2; \quad (2)$$

$$\text{Correlation} = \sum_{i,j=0}^{levels-1} P_{i,j}\left[\frac{(i-\mu_i)(j-\mu_j)}{\sqrt{(\sigma_i^2)(\sigma_j^2)}}\right]; \quad (3)$$

$$ASM = \sum_{i,j=0}^{levels-1} P_{i,j}^2\Big|; \quad (4)$$

$$\text{Energy} = \sqrt{ASM}; \text{ and} \quad (5)$$

$$\text{Homogeneity} = \sum_{i,j=0}^{levels-1}\frac{P_{i,j}}{1+(i-j)^2}\Big|. \quad (6)$$

Step 408 includes predicting GA progression for the GA lesion using the first set of values and the second set of values. In one or more embodiments, step 408 includes predicting the GA progression for the GA lesion using the first set of values, the second set of values, and a deep learning system. The deep learning system may include, for example, one or more neural network models. In some cases, the deep learning system includes a CNN.

Figure 5:
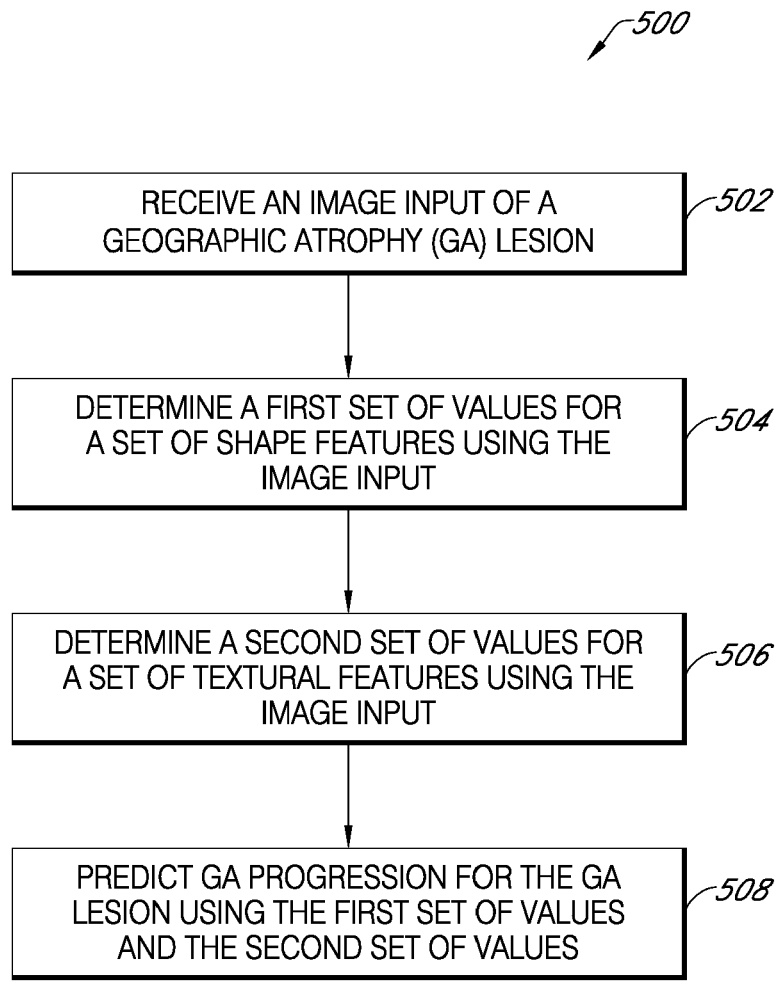
FIG. 5 is a flowchart of a process 500 for identifying prognostic features for a GA lesion in accordance with various embodiments.

FIG. 5 is a flowchart of a process 500 for identifying prognostic features for a GA lesion in accordance with various embodiments. In various embodiments, process 400 is implemented using the lesion evaluation system 100 described in FIG. 1. Further, process 500 may be one example of a manner in which the set of shape features and the set of textural features described in steps 404 and 406 in process 400 in FIG. 4 may be selected. In various embodiments, process 500 is a semi-automated process. In other embodiments, process 500 is a fully automated process.

Step 502 includes receiving test images for a plurality of subjects having GA lesions. The test images include, for example, baseline images for a baseline point in time.

Step 504 includes identifying, for each subject of the plurality of subjects, a change in GA lesion area and a plurality of features using the test images. The change in GA lesion area may be identified based on the baseline images and later images. The later images are images generated for a later point in time (e.g., 3 months, 6 months, 12 months, 18 months, etc. after the baseline point in time). In some cases, these later images are included in the test images.

Step 506 includes correlating the change in GA lesion area with each of the plurality of features to form correlation data. In one or more embodiments, step 506 includes using one or more regression (e.g., linear regression models). Further, step 506 may include computing coefficient of determination ($R^2$) values for the plurality of features using the one or more regression models. The higher the $R^2$ value is for a particular feature, the higher the prognostic potential (or prognostic capability) of that feature is with respect to predicting GA progression or change in GA lesion area.

Step 508 includes selecting a set of shape features and a set of textural features from the plurality of features based on the correlation data generated for the plurality of features. Thus, selecting the set of shape features and the set of textural features based on the correlation data generated for the plurality of features using the test images. In some embodiments, the set of shape features includes all shape features of the plurality of features identified in step 504, the set of textural features includes all textural features of the plurality of features identified in step 504, or both. In one or more embodiments, step 508 includes setting a cutoff or threshold $R^2$ value, a threshold correlation value, or some other type of threshold above which corresponding features are selected. The threshold $R^2$ value may be, for example, a value above 0.05 (e.g., 0.07, 0.08, 0.1, 0.12, 0.14, 0.15, etc.).

IV. Examples/Results

Figure 6:
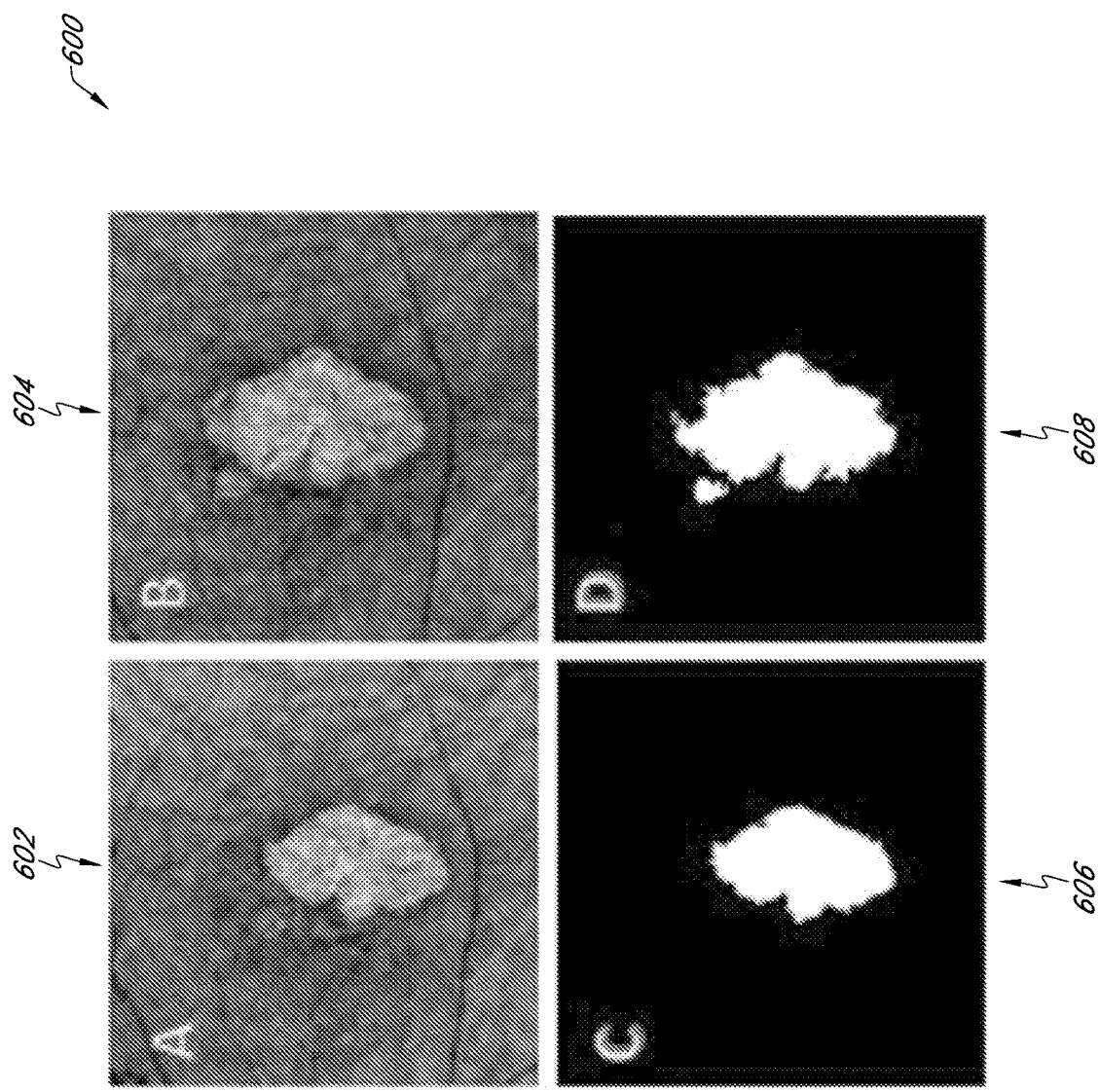
FIG. 6 identifies a set of images from a retrospective study in accordance with various embodiments.

FIG. 6 shows a set of images in accordance with various embodiments. Set of images 600 includes image 602 and image 604, which are two example spectral domain optical coherence tomography (SD-OCT) en face images of subjects having GA lesions. Image 602 is a baseline image and image 604 is a later image for 18 months past the baseline. Set of images 600 includes segmentation mask 606 and segmentation mask 608 corresponding to image 602 and 604, respectively. The GA lesions in the images of FIG. 6 were segmented to form segmentation masks from the OCT en face images using a k-means clustering algorithm based on intensity. In other embodiments, other types of unsupervised learning techniques may be used for segmentation.

FIG. 7 is a table identifying illustrating various metrics for shape and textural features in accordance with various embodiments. Table 700 identifies the mean (standard error of mean) of shape and textural features at a baseline point in time and 18 months out from the baseline point in time. $R^2$ is the coefficient of determination obtained via one or more linear regression models between the baseline and 18-month values for each feature for lesion growth (the absolute difference between the baseline lesion area and the 18-month lesion area). The values in table 700 correspond to the set of images 600 in FIG. 6.

Figure 8:
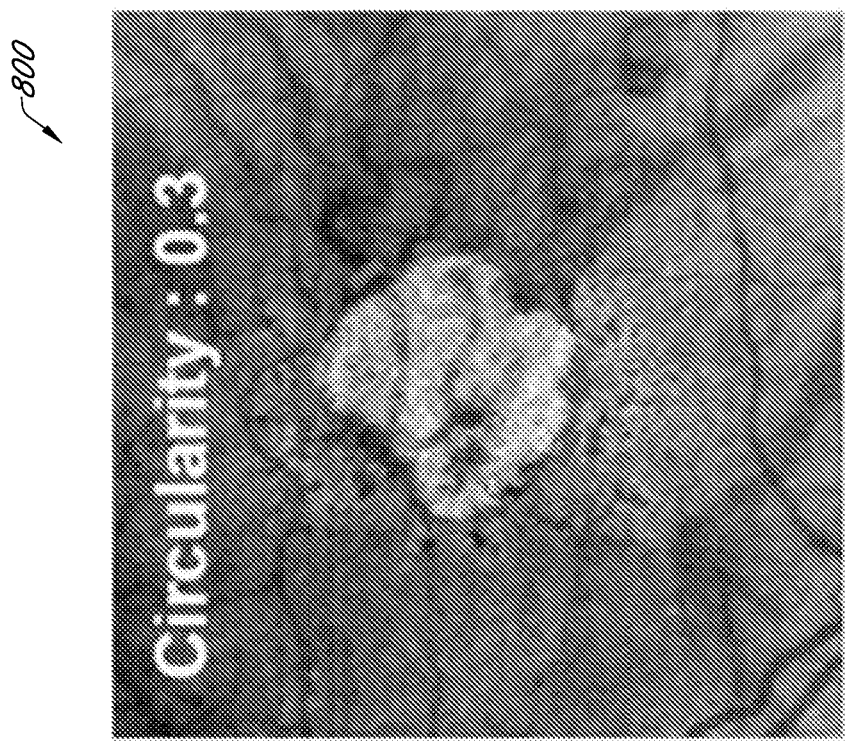
FIG. 8 illustrates an OCT en face image in which circularity has been overlaid in accordance with various embodiments.

FIG. 8 illustrates an OCT en face image 800 in which circularity has been overlaid in accordance with various embodiments.

Figure 9:
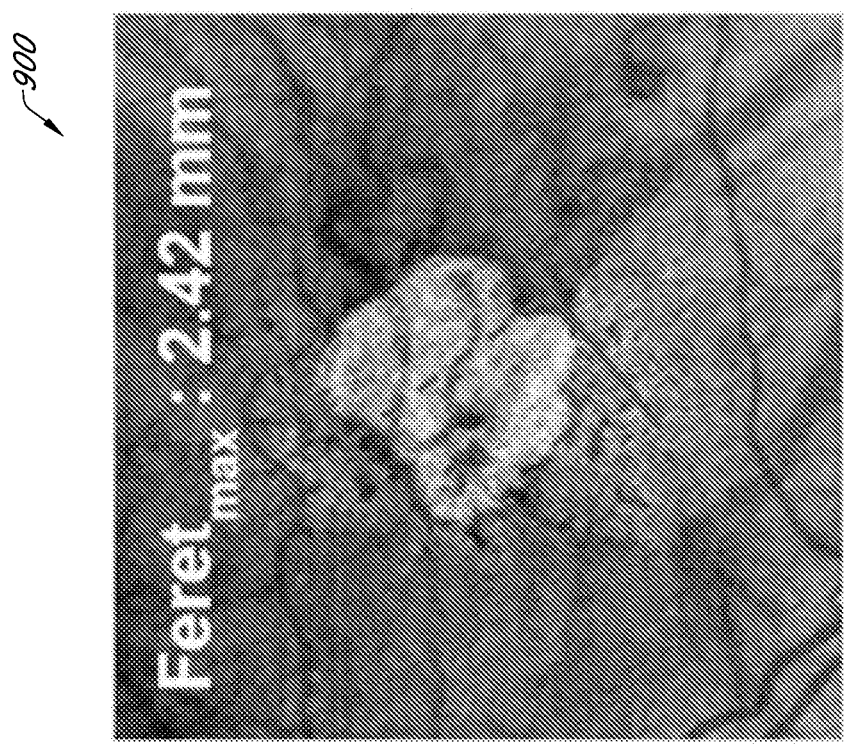
FIG. 9 illustrates an OCT en face image in which the maximum Feret diameter has been overlaid in accordance with various embodiments.

FIG. 9 illustrates an OCT en face image 900 in which the maximum Feret diameter has been overlaid in accordance with various embodiments.

Figure 10:
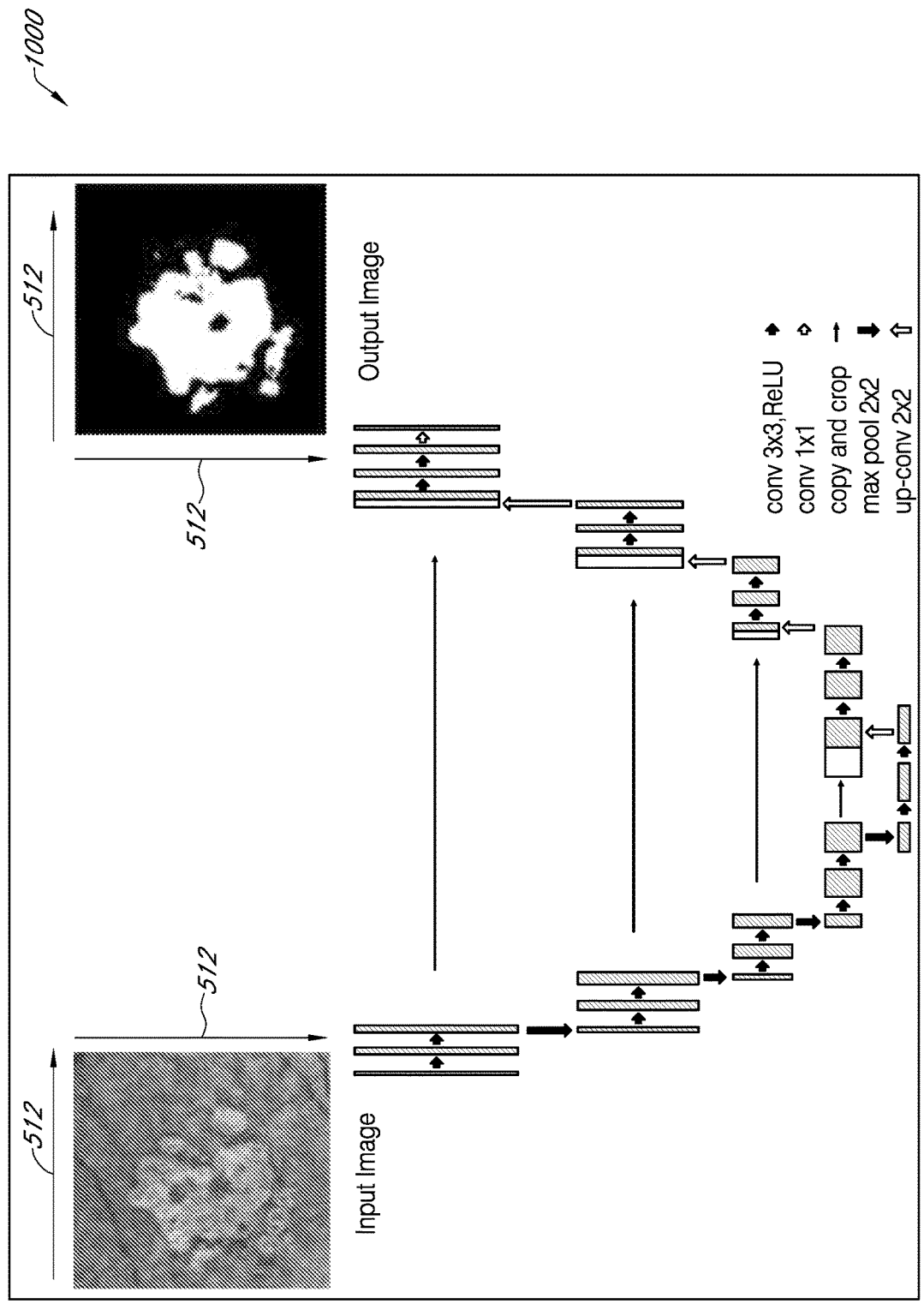
FIG. 10 illustrates an example infrastructure for a deep learning system used in automating segmentation in accordance with various embodiments.

FIG. 10 illustrates an example infrastructure 1000 for a deep learning system used in automating segmentation in accordance with various embodiments.

Figure 11:
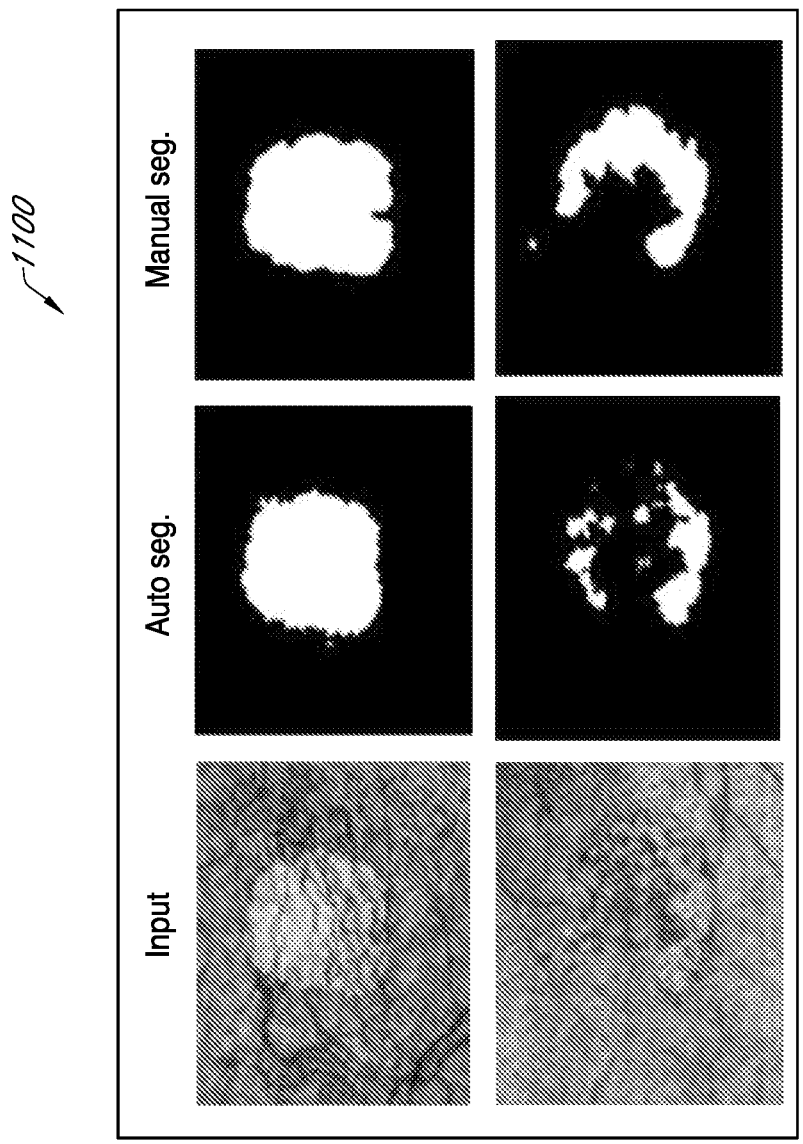
FIG. 11 illustrates a comparison in the performance of segmentation masks generated via automated segmentation versus manual segmentation.

FIG. 11 illustrates a comparison in the performance of segmentation masks generated via automated segmentation versus manual segmentation in accordance with various embodiments.

Figure 12:
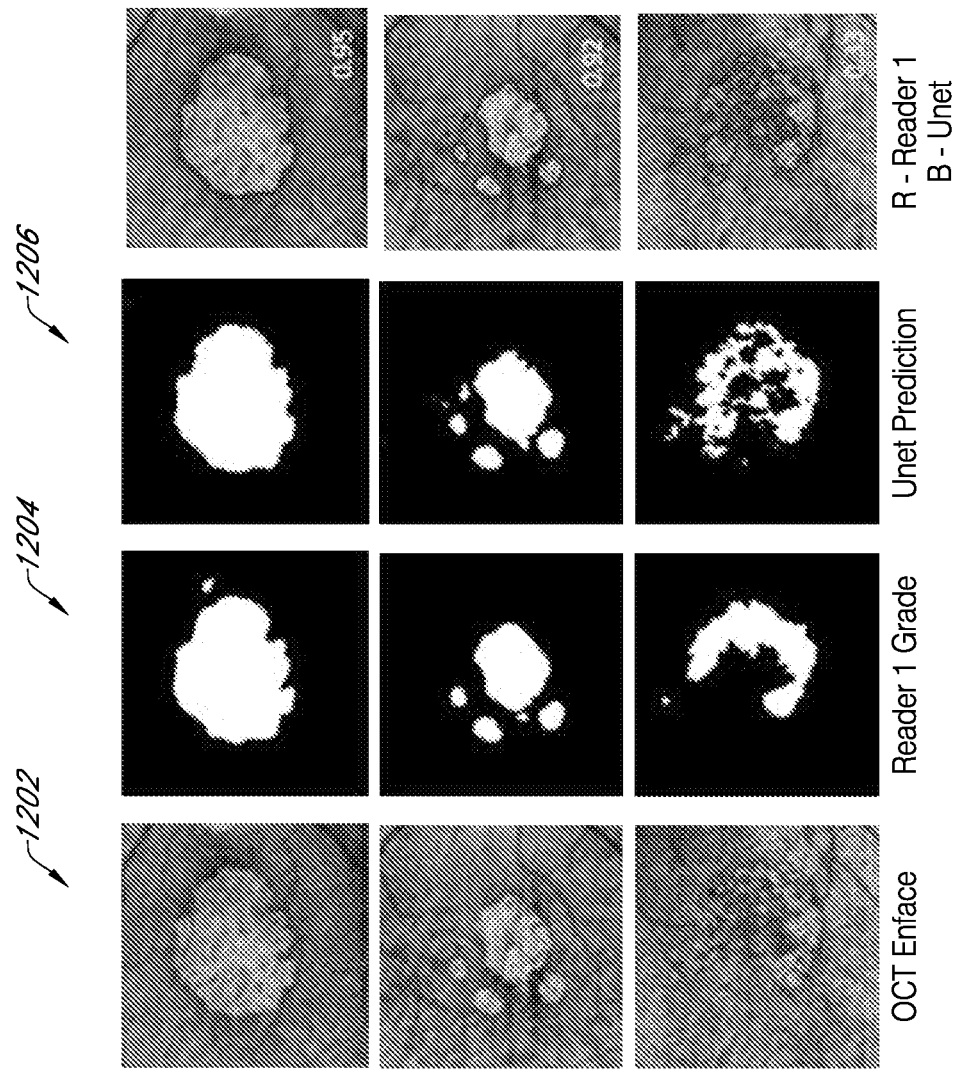
FIG. 12 illustrates segmentation masks produced via manual segmentation and via automated segmentation in accordance with various embodiments.

FIG. 12 illustrates segmentation masks produced via manual segmentation and via automated segmentation in accordance with various embodiments. In FIG. 12, OCT en face images 1202 are segmented manually to produce first masks 1204 and segmented automatically using a deep learning system that includes a U-Net to produce second masks 1206.

Figure 13:
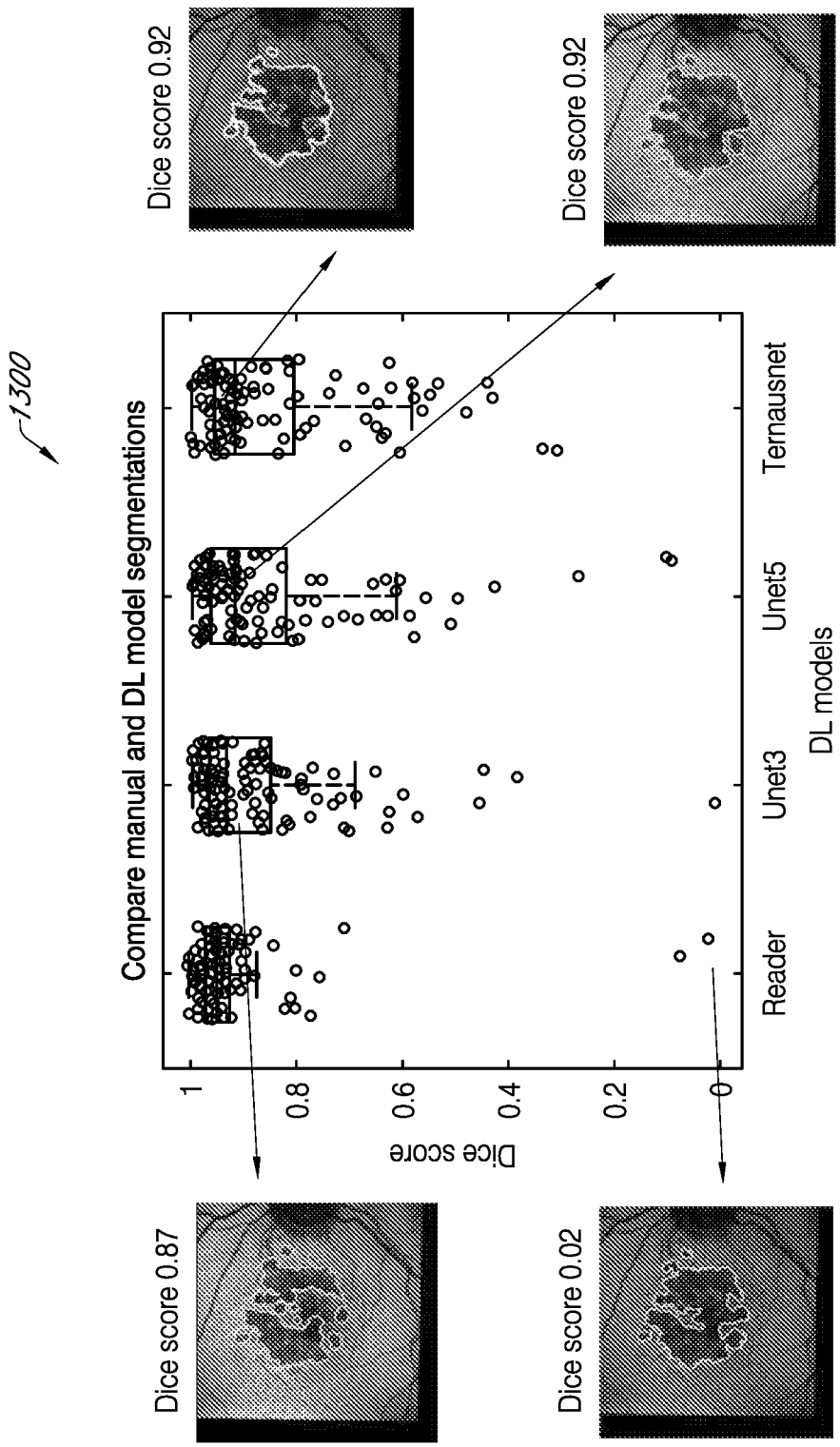
FIG. 13 illustrates a comparison of manual segmentation to different types of automated segmentation methods using DICE scores in accordance with various embodiments.

FIG. 13 illustrates a comparison 1300 of manual segmentation to different types of automated segmentation methods using DICE scores in accordance with various embodiments. The automated segmentation methods use different types of U-Net based deep learning systems.

Figure 14:
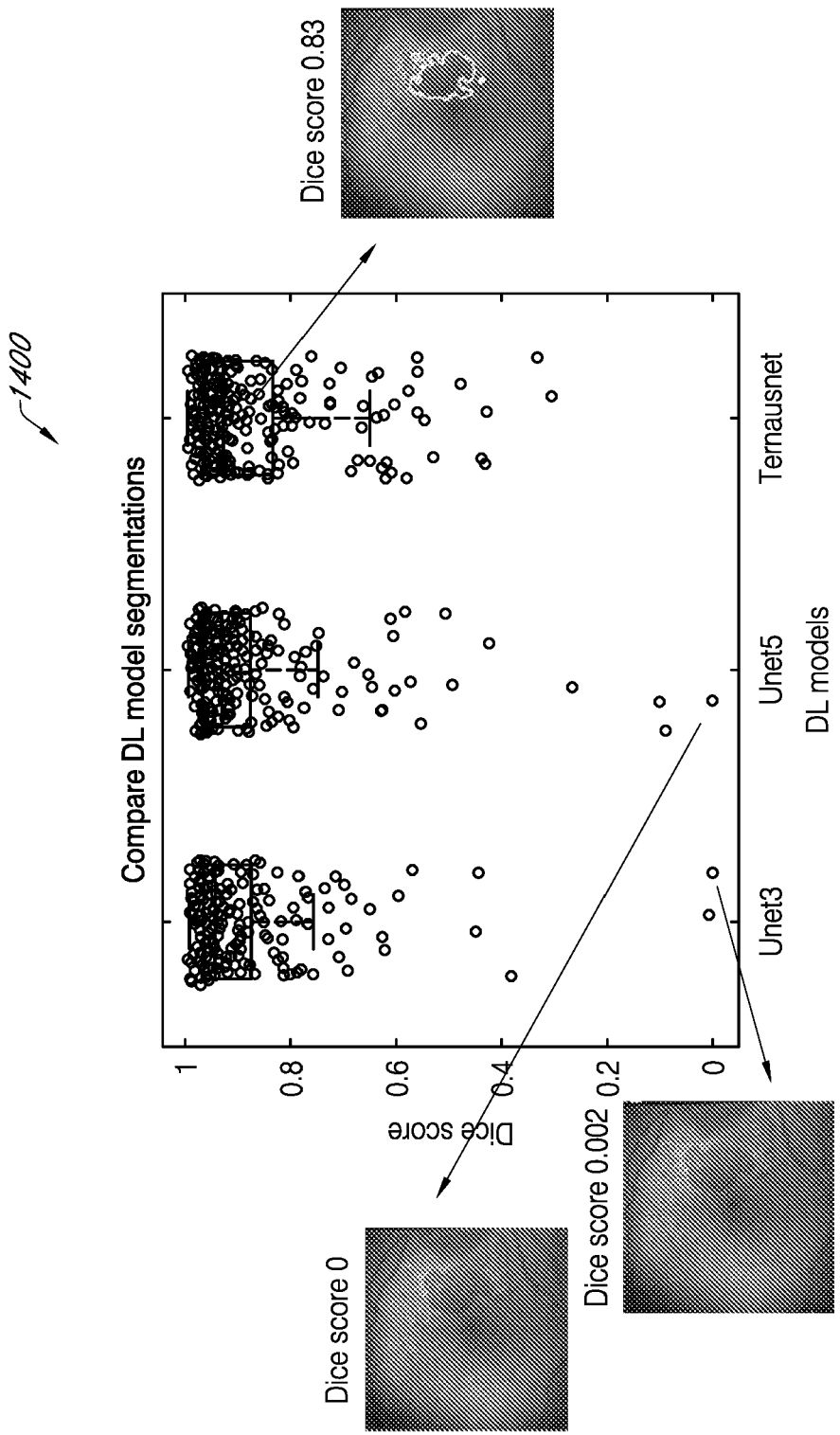
FIG. 14 illustrates a comparison of different types of automated segmentation methods using DICE scores in accordance with various embodiments.

FIG. 14 illustrates a comparison 1400 of different types of automated segmentation methods using DICE scores in accordance with various embodiments. The automated segmentation methods use different types of U-Net based deep learning systems.

Figure 15:
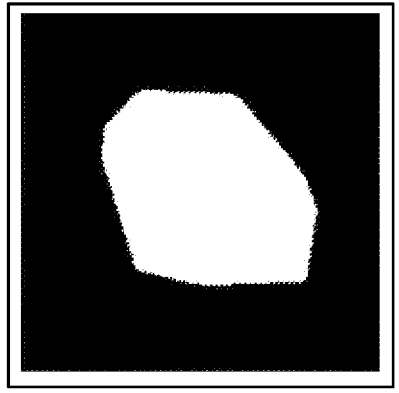
FIG. 15 illustrates various segmentation masks for a same multifocal GA lesion in accordance with various embodiments.
Figure 15:
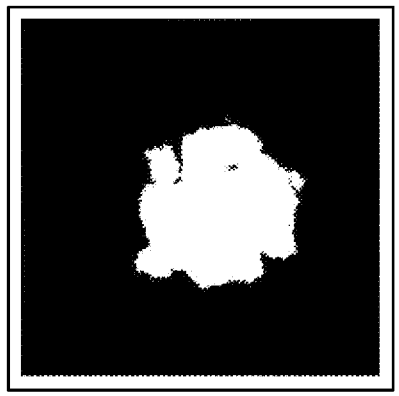
Figure 15:
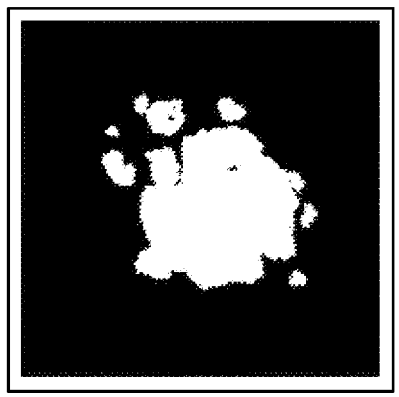

FIG. 15 illustrates various segmentation masks for a same multifocal GA lesion in accordance with various embodiments. Segmentation mask 1502 shows all lesions of the multifocal GA lesion. Segmentation mask 1504 shows the largest lesion of the multifocal GA lesion. Segmentation mask 1506 shows the overall shape or convex hull for the multifocal GA lesion.

Figure 16:
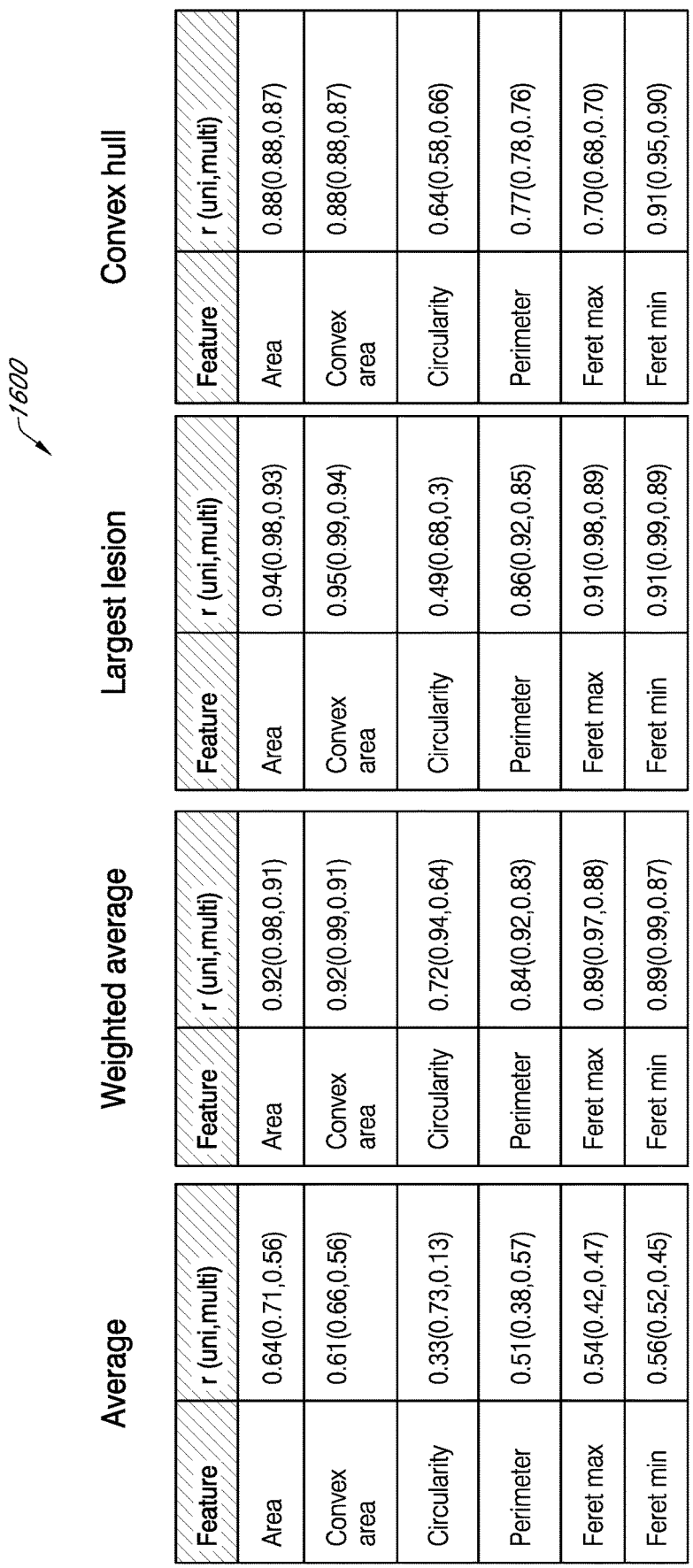
FIG. 16 illustrates a comparison of features extracted via manual segmentation and automated segmentation in accordance with various embodiments.

FIG. 16 illustrates a comparison 1600 of features extracted via manual segmentation and automated segmentation in accordance with various embodiments. Comparison 1600 illustrates the performance automated segmentation using a U-Net based deep learning system versus manual segmentation for the total number of lesions identified, the total lesion area, the total lesion perimeter.

Figure 17:
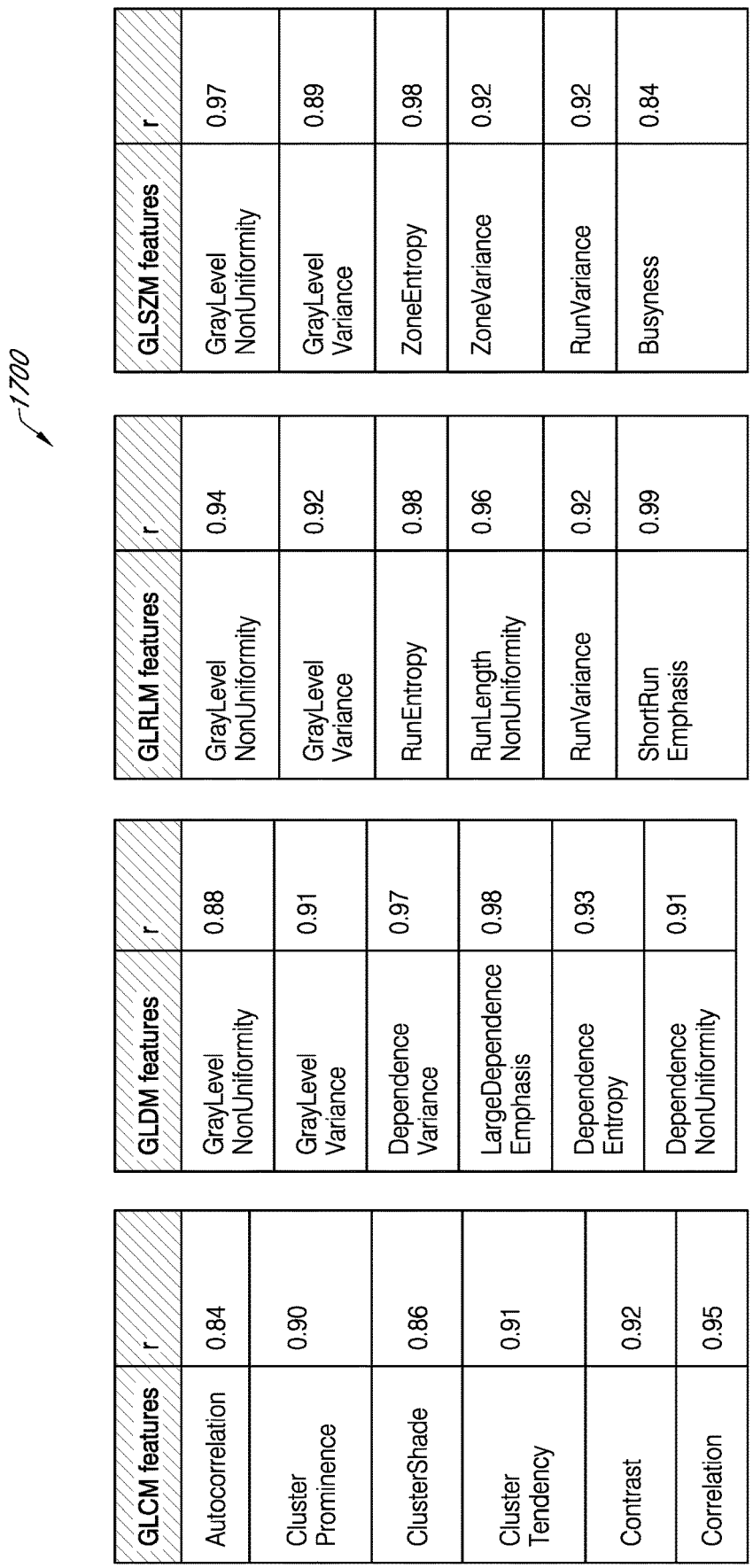
FIG. 17 illustrates a set of tables showing how features can be used to determine correlations between automated and manual segmentations in accordance with various embodiments.

FIG. 17 illustrates a set of tables 1700 showing how features can be used to determine correlations between automated and manual segmentations in accordance with various embodiments.

Figure 18:
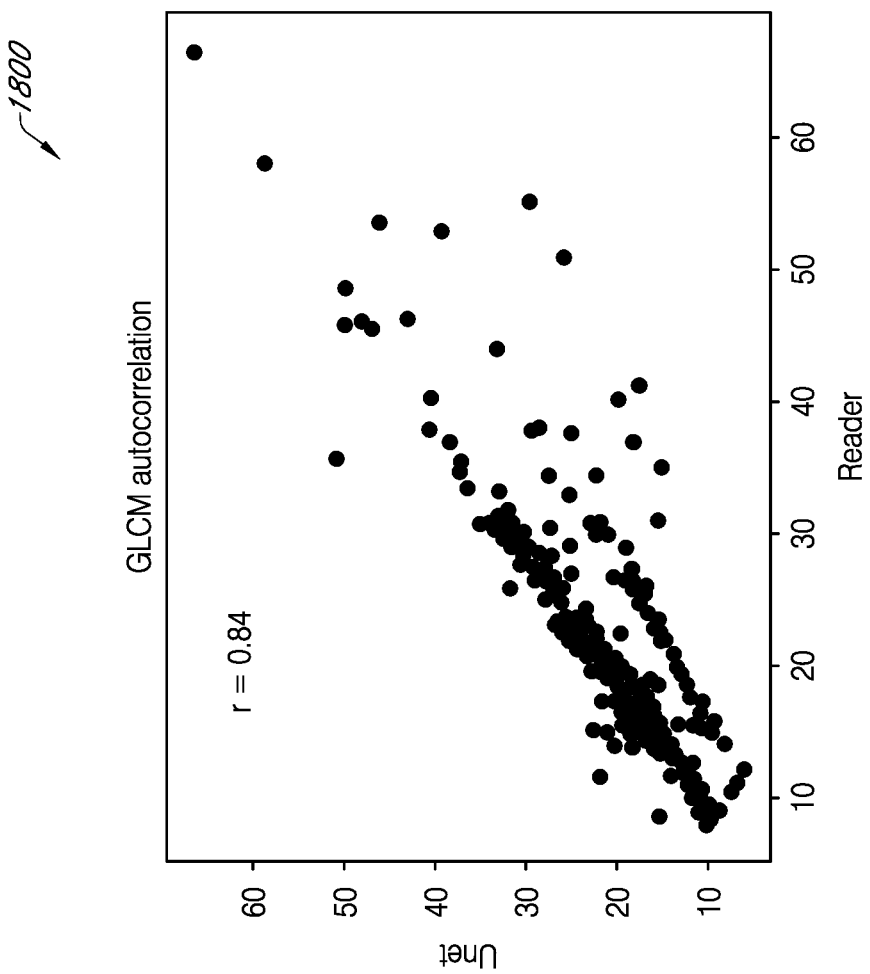
FIG. 18 illustrates a set of tables showing how features can be used to determine correlations between automated and manual segmentations in accordance with various embodiments.
Figure 18:
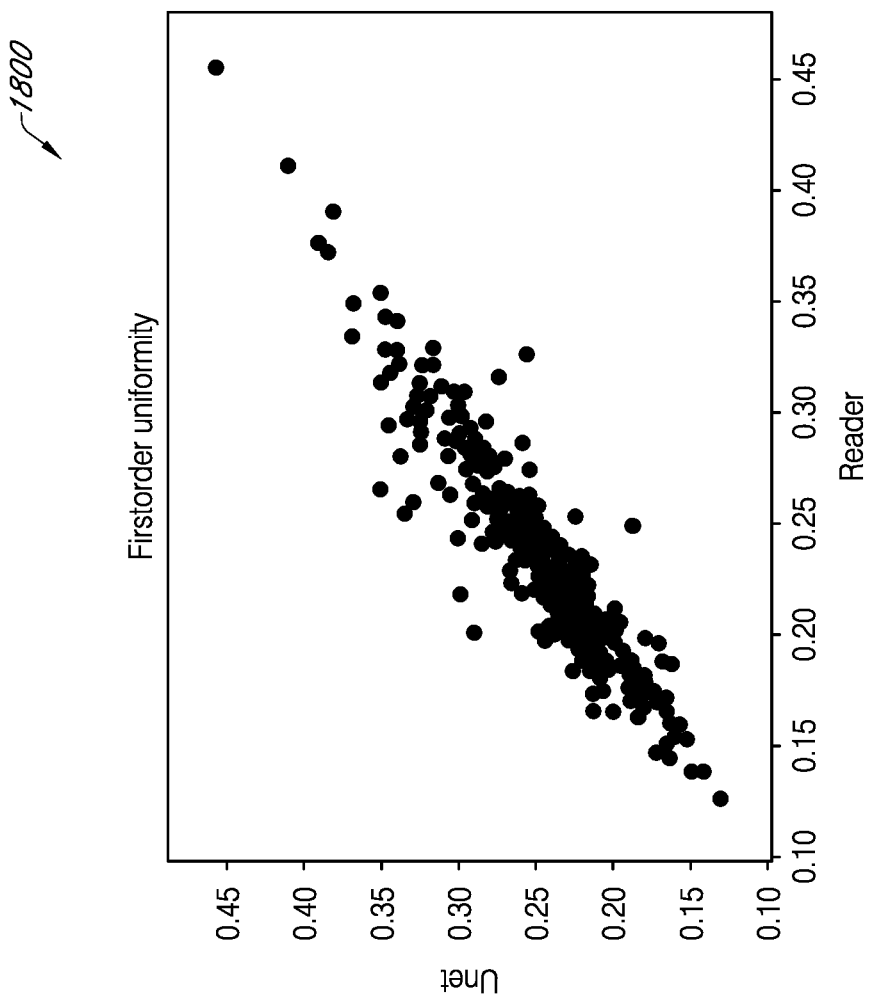
Figure 18:
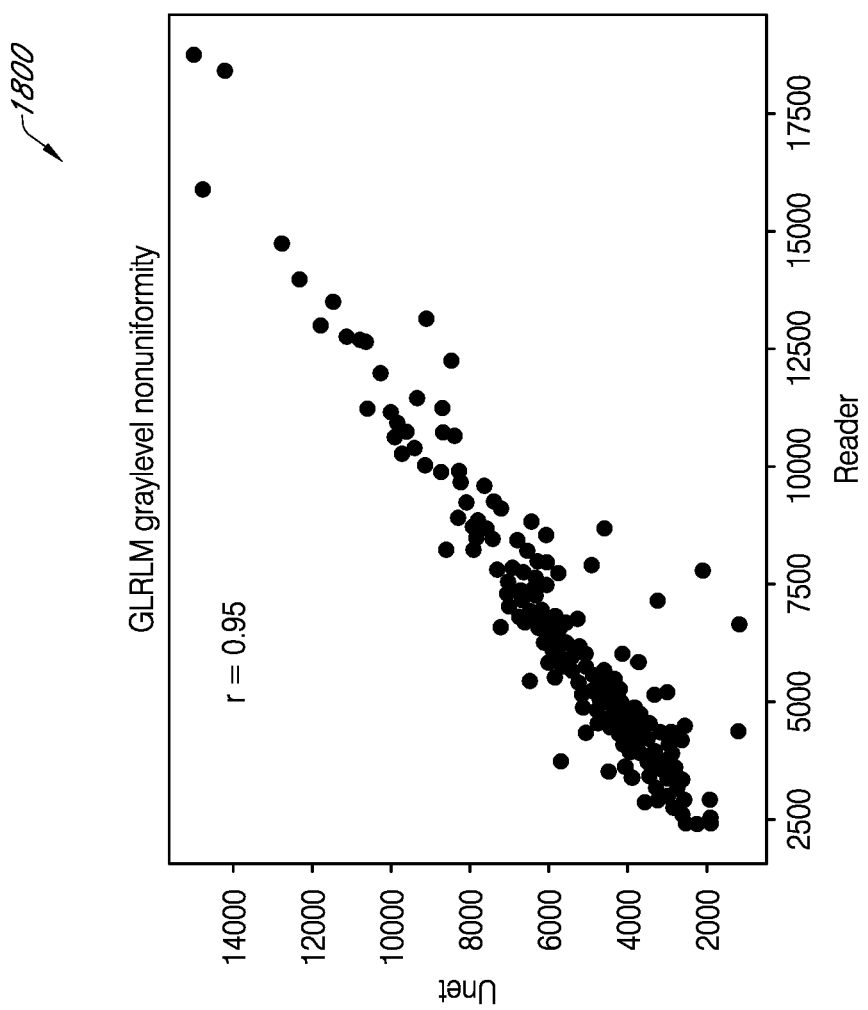
Figure 18:
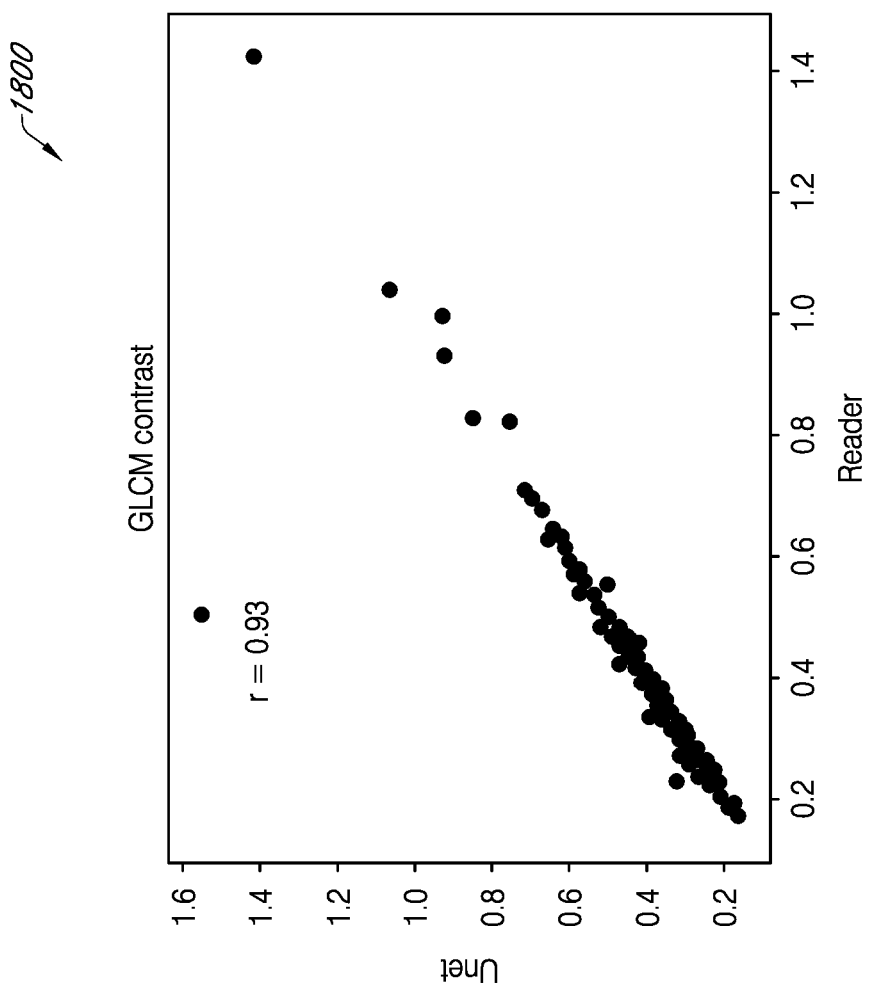
Figure 18:
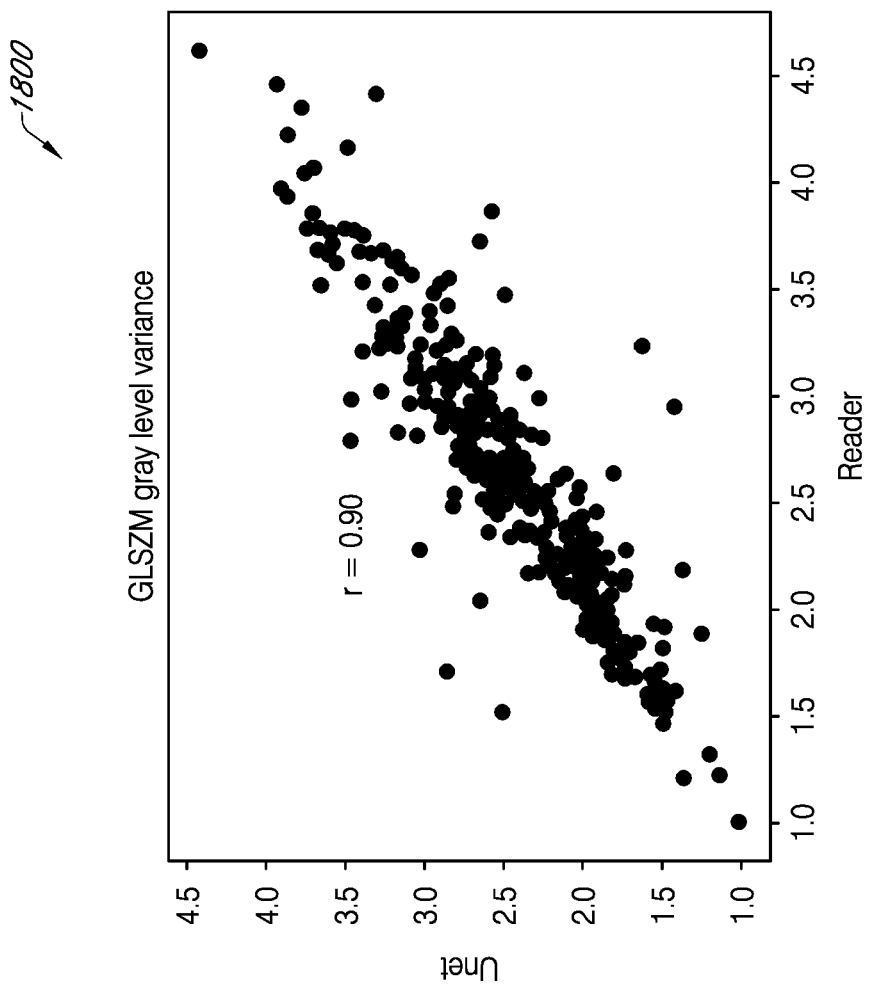
Figure 18:
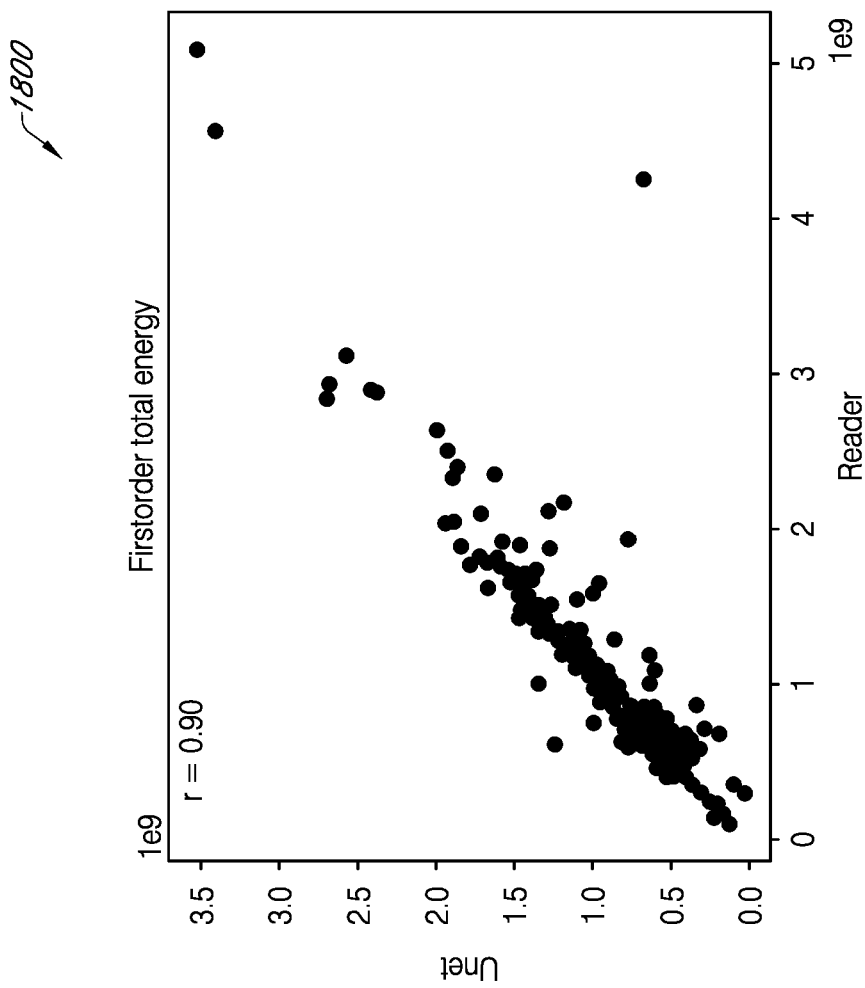

FIG. 18 illustrates a set of tables 1800 showing how features can be used to determine correlations between automated and manual segmentations in accordance with various embodiments. In FIG. 18, r is the Pearson correlation coefficient. As shown, automated segmentation is strongly correlated with manual segmentation (e.g., an "r" at or above 0.8).

V. Computer Implemented System

Figure 19:
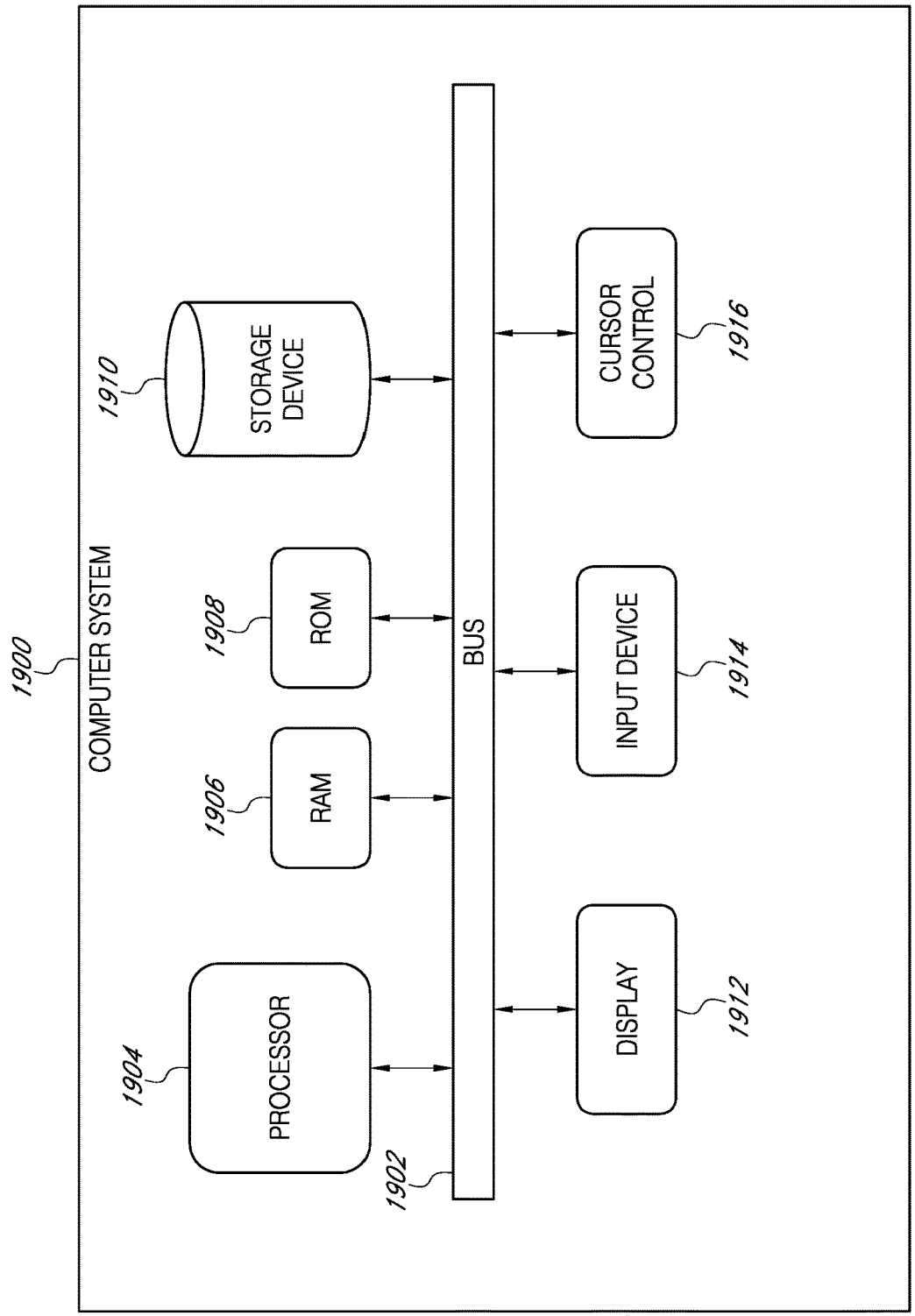
FIG. 19 is a block diagram of a computer system in accordance with various embodiments.

FIG. 19 is a block diagram of a computer system in accordance with various embodiments. Computer system 1900 may be an example of one implementation for computing platform 102 described above in FIG. 1. In one or more examples, computer system 1900 can include a bus 1902 or other communication mechanism for communicating information, and a processor 1904 coupled with bus 1902 for processing information. In various embodiments, computer system 1900 can also include a memory, which can be a random-access memory (RAM) 1906 or other dynamic storage device, coupled to bus 1902 for determining instructions to be executed by processor 1904. Memory also can be used for storing temporary variables or other intermediate information during execution of instructions to be executed by processor 1904. In various embodiments, computer system 1900 can further include a read only memory (ROM) 1908 or other static storage device coupled to bus 1902 for storing static information and instructions for processor 1904. A storage device 1910, such as a magnetic disk or optical disk, can be provided and coupled to bus 1902 for storing information and instructions.

In various embodiments, computer system 1900 can be coupled via bus 1902 to a display 1912, such as a cathode ray tube (CRT) or liquid crystal display (LCD), for displaying information to a computer user. An input device 1914, including alphanumeric and other keys, can be coupled to bus 1902 for communicating information and command selections to processor 1904. Another type of user input device is a cursor control 1916, such as a mouse, a joystick, a trackball, a gesture input device, a gaze-based input device, or cursor direction keys for communicating direction information and command selections to processor 1904 and for controlling cursor movement on display 1912. This input device 1914 typically has two degrees of freedom in two axes, a first axis (e.g., x) and a second axis (e.g., y), that allows the device to specify positions in a plane. However, it should be understood that input devices 1914 allowing for three-dimensional (e.g., x, y and z) cursor movement are also contemplated herein.

Consistent with certain implementations of the present teachings, results can be provided by computer system 1900 in response to processor 1904 executing one or more sequences of one or more instructions contained in RAM

1906. Such instructions can be read into RAM 1906 from another computer-readable medium or computer-readable storage medium, such as storage device 1910. Execution of the sequences of instructions contained in RAM 1906 can cause processor 1904 to perform the processes described herein. Alternatively, hard-wired circuitry can be used in place of or in combination with software instructions to implement the present teachings. Thus, implementations of the present teachings are not limited to any specific combination of hardware circuitry and software.

The term "computer-readable medium" (e.g., data store, data storage, storage device, data storage device, etc.) or "computer-readable storage medium" as used herein refers to any media that participates in providing instructions to processor 1904 for execution. Such a medium can take many forms, including but not limited to, non-volatile media, volatile media, and transmission media. Examples of non-volatile media can include, but are not limited to, optical, solid state, magnetic disks, such as storage device 1910. Examples of volatile media can include, but are not limited to, dynamic memory, such as RAM 1906. Examples of transmission media can include, but are not limited to, coaxial cables, copper wire, and fiber optics, including the wires that comprise bus 1902.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In addition to computer readable medium, instructions or data can be provided as signals on transmission media included in a communications apparatus or system to provide sequences of one or more instructions to processor 1904 of computer system 1900 for execution. For example, a communication apparatus may include a transceiver having signals indicative of instructions and data. The instructions and data are configured to cause one or more processors to implement the functions outlined in the disclosure herein. Representative examples of data communications transmission connections can include, but are not limited to, telephone modem connections, wide area networks (WAN), local area networks (LAN), infrared data connections, NFC connections, optical communications connections, etc.

It should be appreciated that the methodologies described herein, flow charts, diagrams, and accompanying disclosure can be implemented using computer system 1900 as a standalone device or on a distributed network of shared computer processing resources such as a cloud computing network.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above. It should be understood that the various engines described herein can be provided on a computer system, such as computer system 1900, whereby processor 1904 would execute the analyses and determinations provided by these engines, subject to instructions provided by any one of, or a combination of, the memory components RAM 1906, ROM, 1908, or storage device 1910 and user input provided via input device 1914.

VI. Additional Considerations

While the present teachings are described in conjunction with various embodiments, it is not intended that the present teachings be limited to such embodiments. On the contrary, the present teachings encompass various alternatives, modifications, and equivalents, as will be appreciated by those of skill in the art. The present description provides preferred exemplary embodiments only, and is not intended to limit the scope, applicability or configuration of the disclosure. Rather, the present description of the preferred exemplary embodiments will provide those skilled in the art with an enabling description for implementing various embodiments. It is understood that various changes may be made in the function and arrangement of elements without departing from the spirit and scope as set forth in the appended claims.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

Specific details are given in the present description to provide an understanding of the embodiments. However, it is understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A method for evaluating a geographic atrophy lesion, the method comprising:
   receiving a first image of a geographic atrophy (GA) lesion of a subject;
   inputting the first image into a deep learning system; and
   generating a first segmentation output using the deep learning system, the first segmentation output identifying pixels in the first image corresponding to the GA lesion;
   selecting a set of shape features and a set of textural features from a plurality of features based on correlation data generated for the plurality of features using test images for a plurality of subjects having GA lesions;
   determining a first set of values for the set of shape features using the first segmentation output;
   determining a second set of values for the set of textural features using the first segmentation output; and
   predicting GA progression for the GA lesion using the first set of values and the second set of values.

2. The method of claim 1, further comprising:
   identifying, for each subject of the plurality of subjects, a change in GA lesion area and a plurality of features using the test images; and
   correlating the change in GA lesion area with each of the plurality of features to form the correlation data.

3. The method of claim 1, wherein the set of shape features comprises at least one of a lesion area, a convex area, perimeter, circularity, a maximum Feret diameter, a minimum Feret diameter, a square root of a GA lesion area, a square root of the perimeter, or a square root of the circularity.

4. The method of claim 1, wherein the set of textural features comprises at least one of contrast, correlation, energy, or homogeneity.

5. The method of claim 1, wherein the first image is a fundus autofluorescence (FAF) image.

6. The method of claim 1, wherein the first image is an optical coherence tomography (OCT) image.

7. The method of claim 1, further comprising:
   receiving a second image of the GA lesion of the subject;
     wherein the second image is associated with a baseline point in time; and
     wherein the first image is associated with a point in time after the baseline point in time;
   generating a second segmentation output using the deep learning system, the second segmentation output identifying pixels in the second image corresponding to the GA lesion; and
   determining GA progression using the first segmentation output and the second segmentation output generated for the second image of the GA lesion of the subject.

8. The method of claim 1, wherein the deep learning system comprises a neural network model.

9. The method of claim 8, wherein the neural network model is a convolutional neural network.

10. A system comprising:
    one or more data processors; and
    a non-transitory computer readable storage medium containing instructions which, when executed on the one or more data processors, cause the one or more data processors to:
      receive an image of a geographic atrophy (GA) lesion of a subject;
      input the image into a deep learning system; and
      generate a first segmentation output using the deep learning system, the first segmentation output identifying pixels in the image corresponding to the GA lesion;
      select a set of shape features and a set of textural features from a plurality of features based on correlation data generated for the plurality of features using test images for a plurality of subjects having GA lesions;
      determine a first set of values for the set of shape features using the first segmentation output;
      determine a second set of values for the set of textural features using the first segmentation output; and
      predict GA progression for the GA lesion using the first set of values and the second set of values.

11. The system of claim 10, wherein:
    the set of shape features comprises at least one of a lesion area, a convex area, perimeter, circularity, a maximum Feret diameter, a minimum Feret diameter, a square root of a GA lesion area, a square root of the perimeter, or a square root of the circularity; and
    the set of textural features comprises at least one of contrast, correlation, energy, or homogeneity.

* * * * *